US012676011B2

(12) United States Patent　(10) Patent No.:　US 12,676,011 B2
Gardner et al.　(45) Date of Patent:　Jul. 7, 2026

(54) RESOLVING OBJECT DETECTION OUTPUTS FROM MULTIPLE OBJECT DETECTION PIPELINES

(71) Applicant: Aurora Operations, Inc., Pittsburgh, PA (US)

(72) Inventors: Rachel Lyn Gardner, Mountain View, CA (US); Yanda Huang, Santa Clara, CA (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 0 days.

(21) Appl. No.: 18/934,680

(22) Filed: Nov. 1, 2024

(65) Prior Publication Data

US 2026/0127890 A1　May 7, 2026

(51) Int. Cl.
*G06V 20/58*　(2022.01)
*G06V 10/764*　(2022.01)
(52) U.S. Cl.
CPC ............ *G06V 20/58* (2022.01); *G06V 10/764* (2022.01)
(58) Field of Classification Search
None
See application file for complete search history.

(56) References Cited

U.S. PATENT DOCUMENTS 8,027,029 B2　9/2011　Lu et al.
9,672,446 B1　6/2017　Vallespi-Gonzalez 11,577,722 B1 *　2/2023　Packer ................. G05D 1/0088
2022/0237419 A1　7/2022　Wyffels
2023/0282005 A1　9/2023　Park et al.

FOREIGN PATENT DOCUMENTS

KR　　10-2224106 B1　3/2021

OTHER PUBLICATIONS

International Search Report and Written Opinion for Application No. PCT/US2025/051543, mailed Feb. 10, 2026, 10 pages.

* cited by examiner

*Primary Examiner* — Samira Monshi
(74) *Attorney, Agent, or Firm* — Dority & Manning, P.A.

(57)　　　　　ABSTRACT

A method includes generating, by a first object detection model of a perception system of an autonomous vehicle and based on a first portion of sensor data describing a first portion of an environment of the autonomous vehicle, a first object detection output that comprises a first predicted class for an object; generating, by a second object detection model of the perception system and based on a second portion of sensor data describing a second portion of the environment, a second object detection output that comprises a predicted distribution over candidate classes for the object; adapting at least a portion of the first object detection output into an adapted representation of the first object detection output; providing the adapted representation in a shared prediction output space with the predicted distribution from the second object detection output; and generating a resolved object detection output based on the adapted representation and the predicted distribution.

23 Claims, 14 Drawing Sheets

300

302

310

320

322

302

324

326

330

350 352

331

338 332

340 334 332

344

332

340

342 336

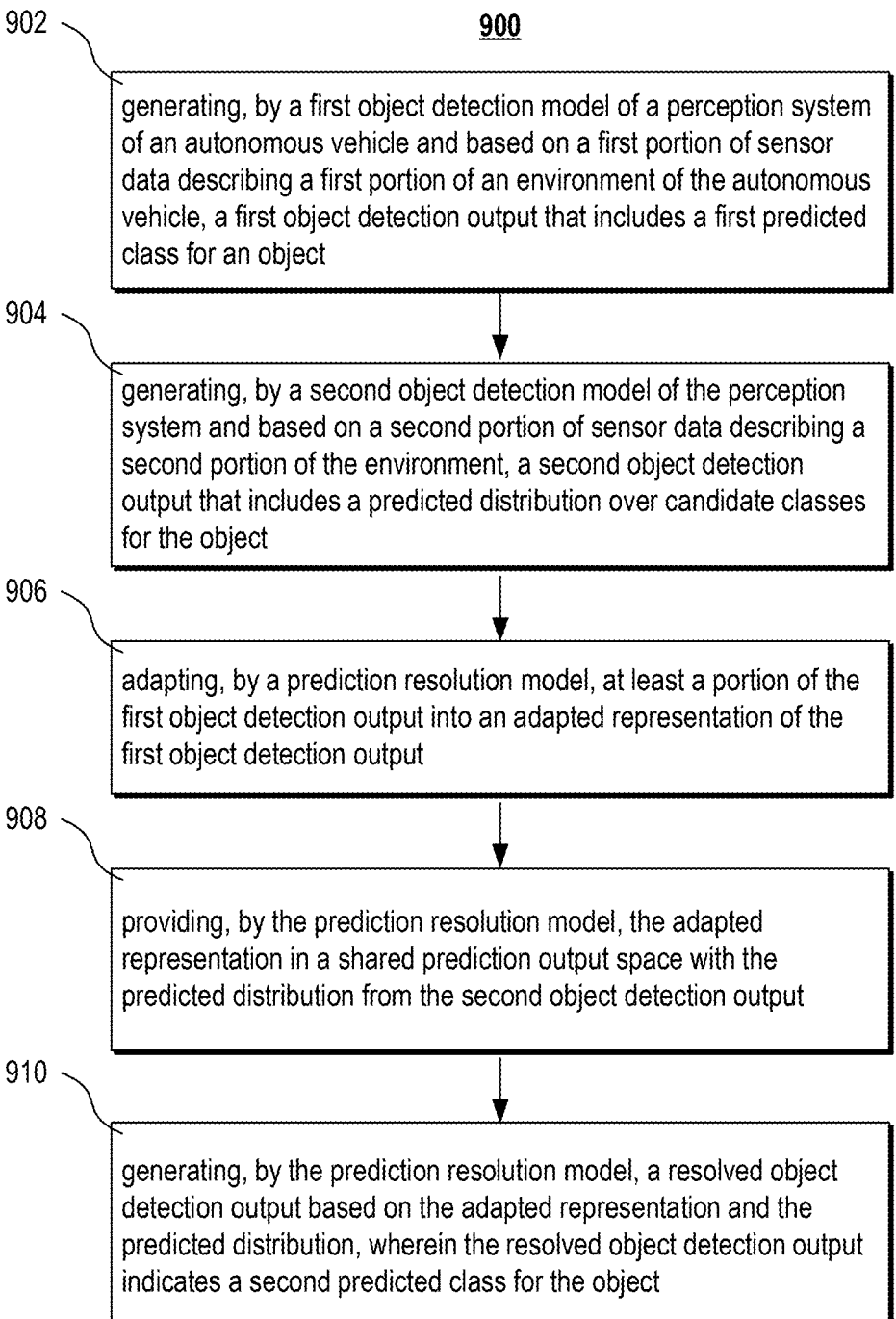

902

<u>900</u> generating, by a first object detection model of a perception system of an autonomous vehicle and based on a first portion of sensor data describing a first portion of an environment of the autonomous vehicle, a first object detection output that includes a first predicted class for an object

904 generating, by a second object detection model of the perception system and based on a second portion of sensor data describing a second portion of the environment, a second object detection output that includes a predicted distribution over candidate classes for the object

906 adapting, by a prediction resolution model, at least a portion of the first object detection output into an adapted representation of the first object detection output

908 providing, by the prediction resolution model, the adapted representation in a shared prediction output space with the predicted distribution from the second object detection output

910 generating, by the prediction resolution model, a resolved object detection output based on the adapted representation and the predicted distribution, wherein the resolved object detection output indicates a second predicted class for the object

*FIG. 9*

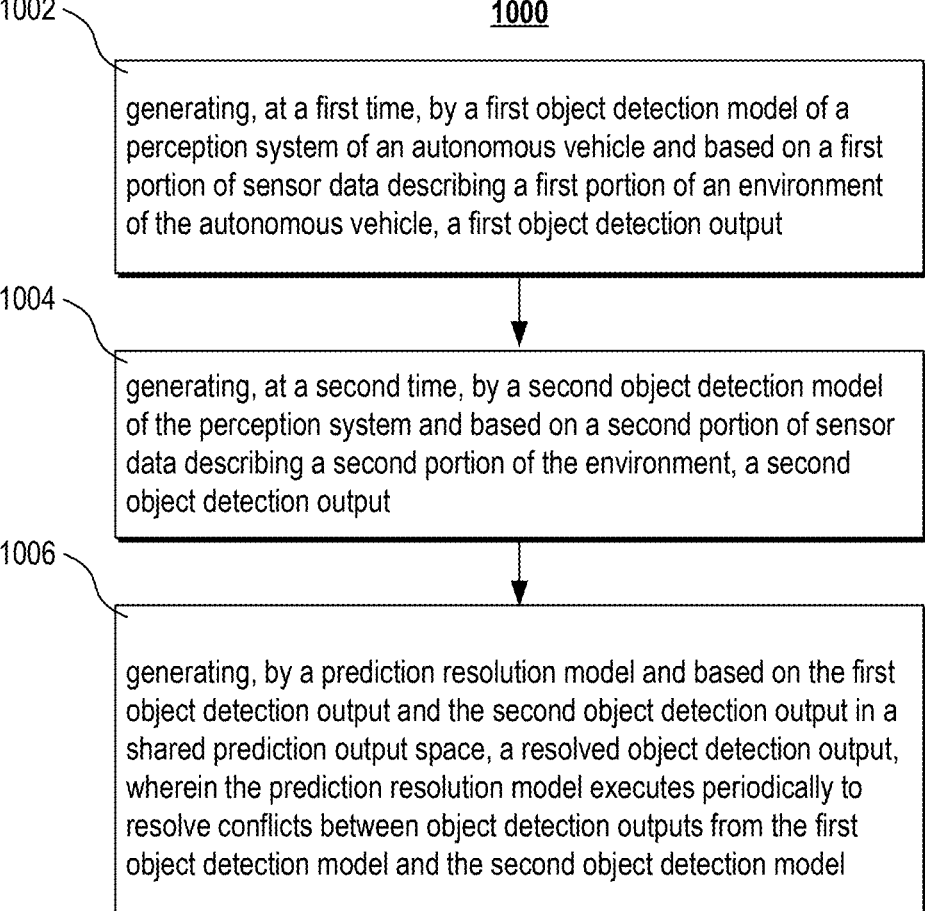

1002

1000 generating, at a first time, by a first object detection model of a perception system of an autonomous vehicle and based on a first portion of sensor data describing a first portion of an environment of the autonomous vehicle, a first object detection output

1004 generating, at a second time, by a second object detection model of the perception system and based on a second portion of sensor data describing a second portion of the environment, a second object detection output

1006 generating, by a prediction resolution model and based on the first object detection output and the second object detection output in a shared prediction output space, a resolved object detection output, wherein the prediction resolution model executes periodically to resolve conflicts between object detection outputs from the first object detection model and the second object detection model

*FIG. 10*

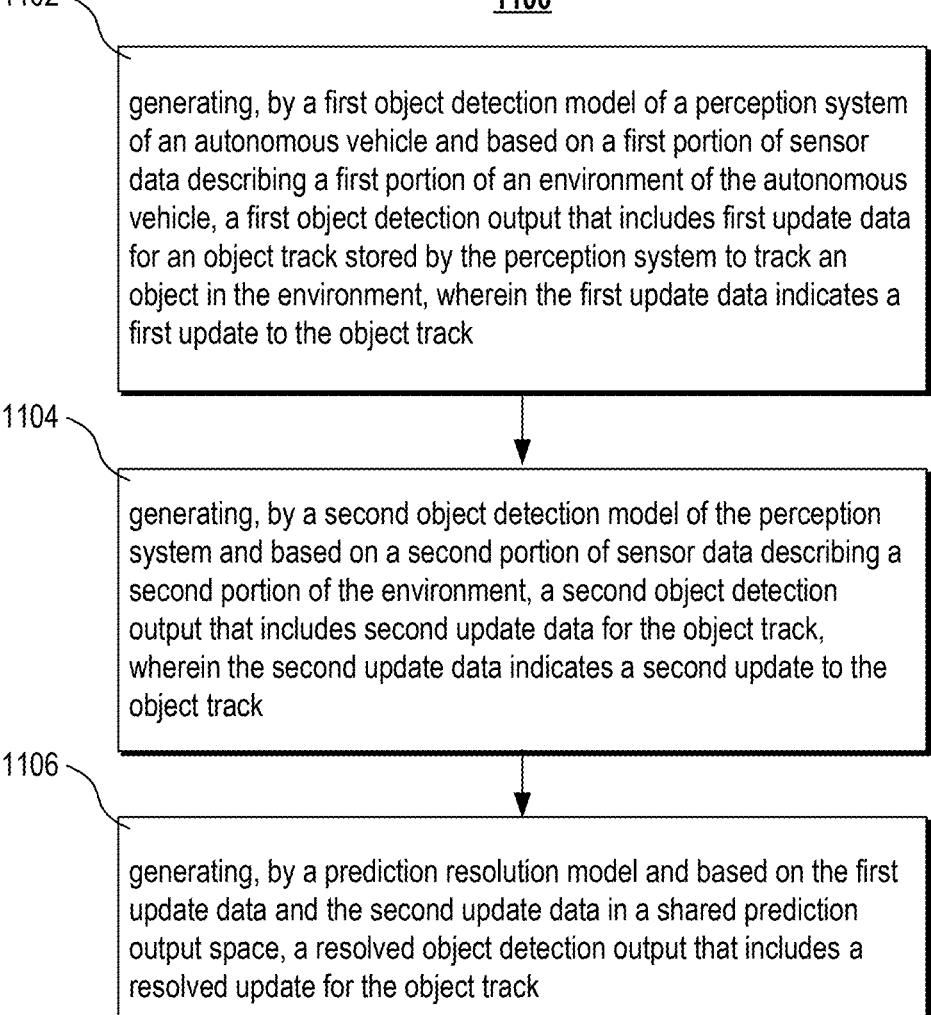

generating, by a first object detection model of a perception system of an autonomous vehicle and based on a first portion of sensor data describing a first portion of an environment of the autonomous vehicle, a first object detection output that includes first update data for an object track stored by the perception system to track an object in the environment, wherein the first update data indicates a first update to the object track

1104 generating, by a second object detection model of the perception system and based on a second portion of sensor data describing a second portion of the environment, a second object detection output that includes second update data for the object track, wherein the second update data indicates a second update to the object track

1106 generating, by a prediction resolution model and based on the first update data and the second update data in a shared prediction output space, a resolved object detection output that includes a resolved update for the object track

*FIG. 11*

RESOLVING OBJECT DETECTION OUTPUTS FROM MULTIPLE OBJECT DETECTION PIPELINES

BACKGROUND

An autonomous platform can process data to perceive an environment through which the autonomous platform travels. For example, an autonomous vehicle can perceive its environment using a variety of sensors and identify objects around the autonomous vehicle. The autonomous vehicle can identify an appropriate path through the perceived surrounding environment and navigate along the path with minimal or no human input.

SUMMARY

Example implementations of the present disclosure provide for object detection system architectures and training techniques that improve the ability of an autonomous vehicle to navigate in dynamic real-world environments. In an example aspect, a perception system architecture may include multiple object detection pipelines. For instance, an example perception system architecture may use distinct object detection models for different perception tasks (e.g., long-range perception; single-modality perception; multi-modal perception; etc.). Each object detection pipeline may generate object detection outputs based on the same or different portions of sensor data, and each object detection may operate with the same or different timing (e.g., sweep or other cycle time). Each object detection model may be specifically adapted for a particular task within its respective pipeline. An example perception system architecture may include a prediction resolution model to ingest individual detection outputs from the different pipelines to generate an overall detection output. In this manner, for instance, the prediction resolution model may leverage the strengths of each respective model executing over its respective sensor inputs at its respective operating frequency to obtain a unified understanding of the environment.

In an example, an object tracking system of the perception system may store object tracks. An object track may record a category of an object and movement of the object within an environment over time. An example object track stores a series of keypoints indicating the current and one or more past locations of the object within the environment. The object tracking system may maintain a current representation of an object track by ingesting updates from multiple different object detection pipelines. For instance, one object detection pipeline may focus on obtaining long-range detections. Another object detection pipeline may focus on matching sensor data to existing tracks and generating updates to those tracks. Another object detection pipeline may focus on image data, while another may focus on multimodal or LIDAR-only data. Each pipeline may execute different models at different frequencies, which may be set based on an availability of new sensor data (e.g., LIDAR sweeps) or a latency demand of various downstream sub-routines. Each pipeline may publish updates to an object track for a tracked object, proposals for new object tracks.

A prediction resolution model may execute asynchronously with the respective component models to update the object tracks based on the full scope of available information. In this manner, for instance, a prediction resolution model may effectively facilitate "voting" among different object detection expert models without disrupting or blocking execution of the different pipelines on their respective tasks. For instance, some object detection pipelines may support a perception task that demands extremely low latency; others may use larger detection models that operate at a slower frequency. An example implementation of the present disclosure may obtain the benefits of multi-expert voting without impacting the performance of the system on its various subtasks by accumulating results from the respective pipelines and then generating a resolved detection output that may be published for use by the respective system(s) for future cycles or by downstream system(s) for, for instance, planning motions of the vehicle, understanding or mapping a current state of the environment, or other tasks. The prediction resolution model may be tuned (e.g., using one or more learnable parameters or hyperparameters) to adjust a performance (e.g., improve a performance) of a downstream system.

A prediction resolution model may facilitate improved long-range detections by allowing individual detection pipelines to publish results earlier, with the expectation that as more data becomes available over time from other or the same pipelines the detection result may be updated and resolved. For instance, at long distances, a traffic cone may appear similar to a fire hydrant. A long-range detector model may not be configured to specifically detect fire hydrants. However, the long-range detector model may be configured to generate a "generic" object class so that the presence of an object—even if the class is unconfirmed—may be recorded. The prediction resolution model may process this initial detection result in view of other detections as evidence accumulates. The prediction resolution model may determine based on more recent data from other systems that the object is a traffic cone.

An example prediction resolution model may be a relatively lightweight model configured to aggregate or select individual detection outputs based on a learned weighting or calibration. The prediction resolution model may process respective object detection outputs in a shared prediction output space. For instance, different object detection models may output differently formatted or composed object detection outputs. Different object detection models may exhibit different behavior profiles and failure modes. In lieu of requiring modification and retraining of the respective models themselves, an example prediction resolution model may adapt or calibrate the individual outputs to obtain representations of the different detection outputs that may be processed together in a shared prediction output space.

The prediction resolution model may learn one or more learnable parameters by optimizing over a dataset of unit tests. The unit tests may include examples of conflicting predictions from different object detection pipelines. The unit tests may be created manually or collected from a dataset of observed or logged scenarios. For example, a unit test may include a set of scenarios in which multiple object detection pipelines exhibit confusion between object categories. The prediction resolution model may learn values for one or more learnable parameters by fitting its resolved outputs to the known correct labels of the unit tests. For instance, the prediction resolution model may undergo an optimization routine to determine weight values that cause the resolved object detection output for each unit test to correspond to the known value for that test. Using unit tests to self-calibrate may simplify and accelerate the refinement of an autonomous vehicle perception system. As different object detection pipelines are developed and updated over time, the prediction resolution model may re-calibrate over the dataset to learn new weightings. For instance, as updated pipelines improve performance on different tasks, the prediction resolution model may update learned weightings to reflect increased confidence or priority for outputs from those improved pipelines.

Example implementations of the present disclosure provide a number of technical effects and advantages. For example, example implementations of this resolution architecture may provide improved performance and reliability without significantly increasing a cost or latency of operating the perception system. Some traditional monolithic model systems may suffer from computational bottlenecks due to the size of a single general-purpose model, may suffer from single points of failure, or may otherwise have reduced robustness to operational domain variation. And some traditional approaches to achieving the benefit of model diversity (e.g., ensembles, mixture-of-experts) may require bespoke training or retraining of the component models or may result in blocking execution of some pipelines while executing others (e.g., creating processing bottlenecks). In contrast, in example implementations of the present disclosure, the component models may remain unmodified from their existing implementation configurations: they may continue to independently publish object detection updates in a non-blocking fashion in fulfillment of their respective tasks.

In this manner, for example, example implementations of the present disclosure may provide for object detection system architectures and training techniques for improving an ability of autonomous vehicles to navigate in dynamic real-world environments. These improvements may thus advance the field of autonomous navigation as a whole. Example implementations of the present disclosure may increase a perception performance with high efficiency, allowing higher levels of perception performance to be achieved with less energy-intensive and costly computational hardware.

In an aspect, the present disclosure provides a first example computer-implemented method. In some implementations, the first example computer-implemented method includes generating, by a first object detection model of a perception system of an autonomous vehicle and based on a first portion of sensor data describing a first portion of an environment of the autonomous vehicle, a first object detection output that includes a first predicted class for an object. In some implementations, the first example computer-implemented method includes generating, by a second object detection model of the perception system and based on a second portion of sensor data describing a second portion of the environment, a second object detection output that includes a predicted distribution over candidate classes for the object. In some implementations, the first example computer-implemented method includes adapting, by a prediction resolution model, at least a portion of the first object detection output into an adapted representation of the first object detection output. In some implementations, the first example computer-implemented method includes providing the adapted representation in a shared prediction output space with the predicted distribution from the second object detection output. In some implementations, the first example computer-implemented method includes generating, by the prediction resolution model, a resolved object detection output based on the adapted representation and the predicted distribution, wherein the resolved object detection output indicates a second predicted class for the object.

In an aspect, the present disclosure provides a second example computer-implemented method. In some implementations, the second example computer-implemented method includes generating, at a first time, by a first object detection model of a perception system of an autonomous vehicle and based on a first portion of sensor data describing a first portion of an environment of the autonomous vehicle, a first object detection output. In some implementations, the second example computer-implemented method includes generating, at a second time, by a second object detection model of the perception system and based on a second portion of sensor data describing a second portion of the environment, a second object detection output. In some implementations, the second example computer-implemented method includes generating, by a prediction resolution model and based on the first object detection output and the second object detection output in a shared prediction output space, a resolved object detection output, wherein the prediction resolution model executes periodically to resolve conflicts between object detection outputs from the first object detection model and the second object detection model.

In an aspect, the present disclosure provides a third example computer-implemented method. In some implementations, the third example computer-implemented method includes generating, by a first object detection model of a perception system of an autonomous vehicle and based on a first portion of sensor data describing a first portion of an environment of the autonomous vehicle, a first object detection output that includes first update data for an object track stored by the perception system to track an object in the environment, wherein the first update data indicates a first update to the object track. In some implementations, the third example computer-implemented method includes generating, by a second object detection model of the perception system and based on a second portion of sensor data describing a second portion of the environment, a second object detection output that includes second update data for the object track, wherein the second update data indicates a second update to the object track. In some implementations, the third example computer-implemented method includes generating, by a prediction resolution model and based on the first update data and the second update data in a shared prediction output space, a resolved object detection output that includes a resolved update for the object track.

Some implementations of the first example method, the second example method, or the third example method include controlling, based on the resolved object detection output, the autonomous vehicle. Some implementations of the first example method, the second example method, or the third example method include generating a motion plan based on the resolved object detection output and controlling the autonomous vehicle based on the motion plan.

In an aspect, the present disclosure provides an example one or more non-transitory computer-readable media storing instructions that are executable by one or more processors to cause a computing system to perform operations. In the example one or more non-transitory computer-readable media, the operations include any one or multiple of the implementations of the first example method, the second example method, or the third example method.

In an aspect, the present disclosure provides an example computing system. The example computing system includes one or more processors. The example computing system includes one or more non-transitory computer-readable media storing instructions that are executable by the one or more processors to cause the computing system to perform. In the example computing system, the operations include any one or multiple of the implementations of the first example method, the second example method, or the third example method.

Other example aspects of the present disclosure are directed to other systems, methods, vehicles, apparatuses, tangible non-transitory computer-readable media, and devices for performing functions described herein. These and other features, aspects and advantages of various implementations will become better understood with reference to the following description and appended claims.

BRIEF DESCRIPTION OF THE DRAWINGS

The accompanying drawings, which are incorporated in and constitute a part of this specification, illustrate implementations of the present disclosure and, together with the description, serve to explain the related principles.

FIG. 9 is a flowchart of an example method for resolving object detection outputs, according to some implementations of the present disclosure.

FIG. 10 is a flowchart of an example method for resolving object detection outputs, according to some implementations of the present disclosure.

FIG. 11 is a flowchart of an example method for resolving object detection outputs, according to some implementations of the present disclosure.

DETAILED DESCRIPTION

The following describes the technology of this disclosure within the context of an autonomous vehicle for example purposes only. As described herein, the technology described herein is not limited to an autonomous vehicle and may be implemented for or within other autonomous platform 110s and other computing systems.

Figure 1:
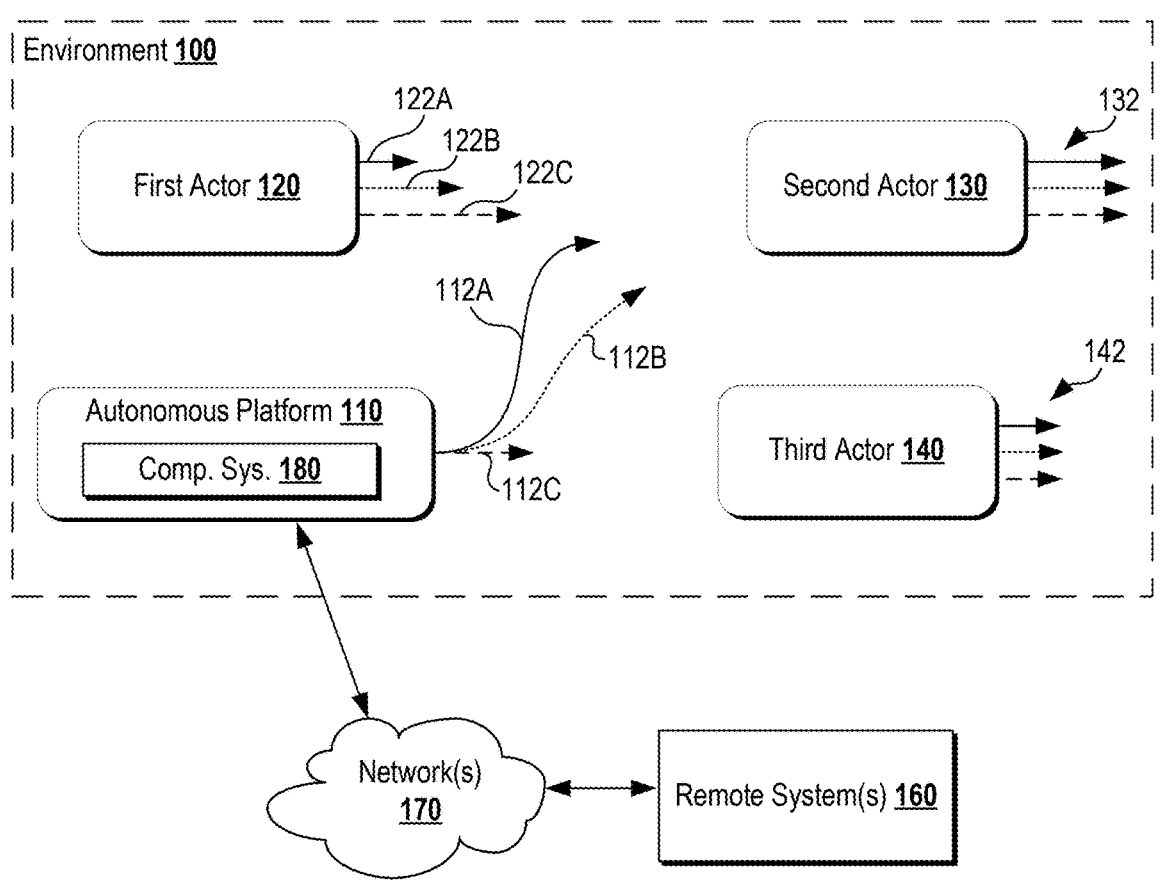
FIG. 1 is a block diagram of an example operational scenario, according to some implementations of the present disclosure.

With reference to FIGS. 1-13, example implementations of the present disclosure are discussed in further detail. FIG. 1 is a block diagram of an example operational scenario 101, according to some implementations of the present disclosure. In the example operational scenario, an environment 100 contains an autonomous platform 110 and a number of objects, including first actor 120, second actor 130, and third actor 140. In the example operational scenario, autonomous platform 110 may move through the environment 100 and interact with the object(s) that are located within the environment 100 (e.g., first actor 120, second actor 130, third actor 140). Autonomous platform 110 may optionally be configured to communicate with remote system(s) 160 through network(s) 170.

The environment 100 may be or include an indoor environment (e.g., within one or more facilities) or an outdoor environment. An indoor environment, for example, may be an environment enclosed by a structure such as a building (e.g., a service depot, maintenance location, manufacturing facility). An outdoor environment, for example, may be one or more areas in the outside world such as, for example, one or more rural areas (e.g., with one or more rural travel ways), one or more urban areas (e.g., with one or more city travel ways, highways), one or more suburban areas (e.g., with one or more suburban travel ways), or other outdoor environments.

Autonomous platform 110 may be any type of platform configured to operate within the environment 100. For example, autonomous platform 110 may be a vehicle configured to autonomously perceive and operate within the environment 100. The vehicles may be a ground-based autonomous vehicle such as, for example, an autonomous car, truck, van. Autonomous platform 110 may be an autonomous vehicle that may control, be connected to, or be otherwise associated with implements, attachments, and/or accessories for transporting people or cargo. This may include, for example, an autonomous tractor optionally coupled to a cargo trailer. Additionally, or alternatively, autonomous platform 110 may be any other type of vehicle such as one or more aerial vehicles, water-based vehicles, space-based vehicles, other ground-based vehicles Autonomous platform 110 may be configured to communicate with the remote system(s) 160. For instance, the remote system(s) 160 may communicate with autonomous platform 110 for assistance (e.g., navigation assistance, situation response assistance), control (e.g., fleet management, remote operation), maintenance (e.g., updates, monitoring), or other local or remote tasks. In some implementations, the remote system(s) 160 may provide data indicating tasks that autonomous platform 110 should perform. For example, as further described herein, the remote system(s) 160 may provide data indicating that autonomous platform 110 is to perform a trip/service such as a user transportation trip/service, delivery trip/service (e.g., for cargo, freight, items)

Autonomous platform 110 may communicate with the remote system(s) 160 using the network(s) 170. The network(s) 170 may facilitate the transmission of signals (e.g., electronic signals) or data (e.g., data from a computing device) and may include any combination of various wired (e.g., twisted pair cable) or wireless communication mechanisms (e.g., cellular, wireless, satellite, microwave, radio frequency) or any desired network topology (or topologies). For example, the network(s) 170 may include a local area network (e.g., intranet), a wide area network (e.g., the Internet), a wireless LAN network (e.g., through Wi-Fi), a cellular network, a SATCOM network, a VHF network, an HF network, a WiMAX based network, or any other suitable communications network (or combination thereof) for trans- mitting data to or from autonomous platform 110.

As shown for example in FIG. 1, environment 100 may include one or more objects. The object(s) may be objects not in motion or not predicted to move ("static objects") or object(s) in motion or predicted to be in motion ("dynamic objects" or "actors"). In some implementations, the environment 100 may include any number of actor(s) such as, for example, one or more pedestrians, animals, vehicles. The actor(s) may move within environment 100 according to one or more actor trajectories. For instance, the first actor 120 may move along any one of the first actor trajectories 122A-C, the second actor 130 may move along any one of the second actor trajectories 132, the third actor 140 may move along any one of the third actor trajectories 142

As further described herein, autonomous platform 110 may utilize its autonomy system(s) to detect these actors (and their movement) and plan its motion to navigate through environment 100 according to one or more platform trajectories 112A-C. Autonomous platform 110 may include onboard computing system(s) 180. The onboard computing system(s) 180 may include one or more processors and one or more memory devices. The one or more memory devices may store instructions executable by the one or more processors to cause the one or more processors to perform operations or functions associated with autonomous plat- form 110, including implementing its autonomy system(s).

Figure 2:
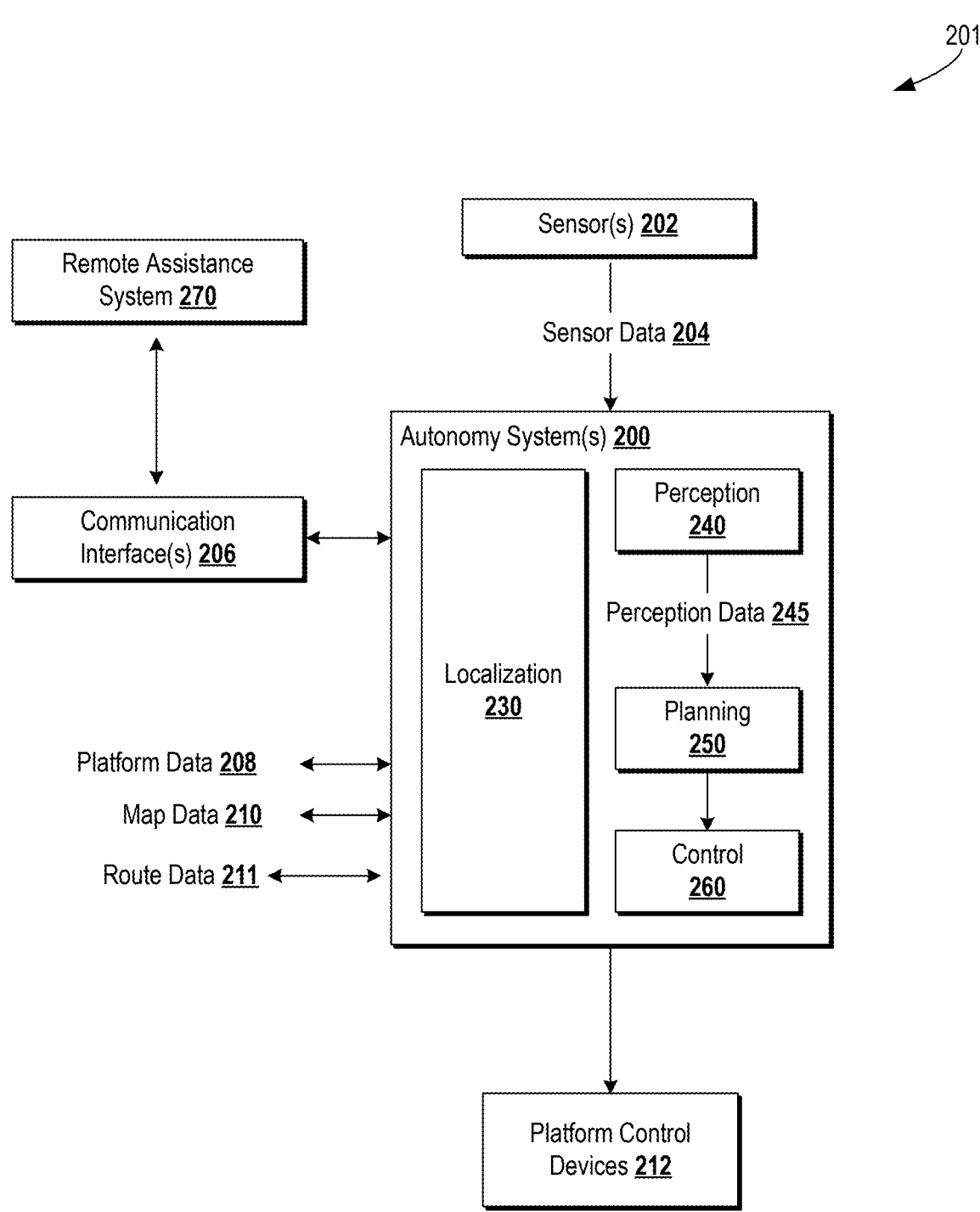
FIG. 2 is a block diagram of an example system, according to some implementations of the present disclosure.

FIG. 2 is a block diagram of an example system 201 including an example autonomy system 200 for an autonomous platform 110, according to some implementations of the present disclosure. In some implementations, the autonomy system 200 may be implemented by a computing system of autonomous platform 110 (e.g., the onboard computing system(s) 180 of autonomous platform 110). The autonomy system 200 may operate to obtain inputs from sensor(s) 202 or other input devices. In some implementa- tions, the autonomy system 200 may additionally obtain platform data 208 (e.g., map data 210, route data 211) from local or remote storage. The autonomy system 200 may generate control outputs for controlling autonomous plat- form 110 (e.g., through platform control devices 212) based on sensor data 204, map data 210, or other data. The autonomy system 200 may include different subsystems for performing various autonomy operations. The subsystems may include a localization system 230, a perception system 240, a planning system 250, and a control system 260. The localization system 230 may determine the location of autonomous platform 110 within its environment; the per- ception system 240 may detect, classify, and track objects and actors in the environment; the planning system 250 may determine a trajectory for autonomous platform 110; and the control system 260 may translate the trajectory into vehicle controls for controlling autonomous platform 110. The autonomy system 200 may be implemented by one or more onboard computing system(s). The subsystems may include one or more processors and one or more memory devices. The one or more memory devices may store instructions executable by the one or more processors to cause the one or more processors to perform operations or functions associated with the subsystems. The computing resources of the autonomy system 200 may be shared among its subsys- tems, or a subsystem may have a set of dedicated computing resources.

In some implementations, the autonomy system 200 may be implemented for or by an autonomous vehicle (e.g., a ground-based autonomous vehicle). The autonomy system 200 may perform various processing techniques on inputs (e.g., the sensor data 204, the map data 210) to perceive and understand the surrounding environment of the vehicle and generate an appropriate set of control outputs to implement a vehicle motion plan (e.g., including one or more trajecto- ries) for traversing the surrounding environment of the vehicle (e.g., environment 100 of FIG. 1). In some imple- mentations, an autonomous vehicle implementing the autonomy system 200 may drive, navigate, or operate with minimal or no interaction from a human operator (e.g., driver, pilot).

In some implementations, autonomous platform 110 may be configured to operate in a plurality of operating modes. For instance, autonomous platform 110 may be configured to operate in a fully autonomous (e.g., self-driving) operat- ing mode in which autonomous platform 110 is controllable without user input (e.g., may drive and navigate with no input from a human operator present in the autonomous vehicle or remote from the autonomous vehicle). Autono- mous platform 110 may operate in a semi-autonomous operating mode in which autonomous platform 110 may operate with some input from a human operator present in autonomous platform 110 (or a human operator that is remote from autonomous platform 110). In some implemen- tations, autonomous platform 110 may enter into a manual operating mode in which autonomous platform 110 is fully controllable by a human operator (e.g., human driver) and may be prohibited or disabled (e.g., temporary, permanently) from performing autonomous navigation (e.g., autonomous driving). Autonomous platform 110 may be configured to operate in other modes such as, for example, park or sleep modes (e.g., for use between tasks such as waiting to provide a trip/service, recharging). In some implementations, autonomous platform 110 may implement vehicle operating assistance technology (e.g., collision mitigation system, power assist steering), for example, to help assist the human operator of autonomous platform 110 (e.g., while in a manual mode).

Autonomy system 200 may be located onboard (e.g., on or within) an autonomous platform 110 and may be config- ured to operate autonomous platform 110 in various envi- ronments. Environment 100 may be a real-world environ- ment or a simulated environment. In some implementations, one or more simulation computing devices may simulate one or more of: the sensors 202, the sensor data 204, commu- nication interface(s) 206, the platform data 208, or the platform control devices 212 for simulating operation of the autonomy system 200.

In some implementations, the autonomy system 200 may communicate with one or more networks or other systems with the communication interface(s) 206. The communica- tion interface(s) 206 may include any suitable components for interfacing with one or more network(s) (e.g., the net- work(s) 170 of FIG. 1), including, for example, transmitters, receivers, ports, controllers, antennas, or other suitable com- ponents that may help facilitate communication. In some implementations, the communication interface(s) 206 may include a plurality of components (e.g., antennas, transmit- ters, or receivers) that allow it to implement and utilize various communication techniques (e.g., multiple-input, multiple-output (MIMO) technology).

In some implementations, the autonomy system 200 may use the communication interface(s) 206 to communicate with one or more computing devices that are remote from autonomous platform 110 (e.g., the remote system(s) 160) over one or more network(s) (e.g., the network(s) 170). For instance, in some examples, one or more inputs, data, or functionalities of the autonomy system 200 may be supplemented or substituted by a remote system communicating over the communication interface(s) 206. For instance, in some implementations, the map data 210 may be downloaded over a network to a remote system using the communication interface(s) 206. In some examples, one or more of localization system 230, perception system 240, planning system 250, or control system 260 may be updated, influenced, nudged, communicated with by a remote system for assistance, maintenance, situational response override, management Sensors 202 may be located onboard autonomous platform 110. In some implementations, sensors 202 may include one or more types of sensor(s). For instance, one or more sensors may include image capturing device(s) (e.g., visible spectrum cameras, infrared cameras). Additionally, or alternatively, sensors 202 may include one or more depth capturing device(s). For example, sensors 202 may include one or more Light Detection and Ranging (LIDAR) sensor (s) or Radio Detection and Ranging (RADAR) sensor(s). Sensors 202 may be configured to generate point data descriptive of at least a portion of a three-hundred-and-sixty-degree view of the surrounding environment. The point data may be point cloud data (e.g., three-dimensional LIDAR point cloud data, RADAR point cloud data). In some implementations, one or more of sensors 202 for capturing depth information may be fixed to a rotational device in order to rotate sensors 202 about an axis. Sensors 202 may be rotated about the axis while capturing data in interval sector packets descriptive of different portions of a three-hundred-and-sixty-degree view of a surrounding environment of autonomous platform 110. In some implementations, one or more of sensors 202 for capturing depth information may be solid state.

Sensors 202 may be configured to capture the sensor data 204 indicating or otherwise being associated with at least a portion of the environment of autonomous platform 110. The sensor data 204 may include image data (e.g., 2D camera data, video data), RADAR data, LIDAR data (e.g., 3D point cloud data), audio data, or other types of data. In some implementations, the autonomy system 200 may obtain input from additional types of sensors, such as inertial measurement units (IMUs), altimeters, inclinometers, odometry devices, location or positioning devices (e.g., GPS, compass), wheel encoders, or other types of sensors. In some implementations, the autonomy system 200 may obtain sensor data 204 associated with particular component(s) or system(s) of an autonomous platform 110. This sensor data 204 may indicate, for example, wheel speed, component temperatures, steering angle, cargo or passenger status In some implementations, the autonomy system 200 may obtain sensor data 204 associated with ambient conditions, such as environmental or weather conditions. In some implementations, the sensor data 204 may include multi-modal sensor data. The multi-modal sensor data may be obtained by at least two different types of sensor(s) (e.g., of the sensors 202) and may indicate static object(s) within an environment of autonomous platform 110. The multi-modal sensor data may include at least two types of sensor data (e.g., camera and LIDAR data). In some implementations, autonomous platform 110 may utilize the sensor data 204 for sensors that are remote from (e.g., offboard) autonomous platform 110. This may include, for example, sensor data 204 captured by a different autonomous platform 110.

Map data 210 may describe an environment in which autonomous platform 110 was, is, or will be located. Map data 210 may provide information about an environment or a geographic area (e.g., environment 100). For example, map data 210 may provide information regarding the identity and location of different travel ways (e.g., roadways), travel way segments (e.g., road segments), buildings, or other items or objects (e.g., lampposts, crosswalks, curbs); the location and directions of boundaries or boundary markings (e.g., the location and direction of traffic lanes, parking lanes, turning lanes, bicycle lanes, other lanes); traffic control data (e.g., the location and instructions of signage, traffic lights, other traffic control devices); obstruction information (e.g., temporary or permanent blockages); event data (e.g., road closures/traffic rule alterations due to parades, concerts, sporting events); nominal vehicle path data (e.g., indicating an ideal vehicle path such as along the center of a certain lane); or any other map data that provides information that assists an autonomous platform 110 in understanding its surrounding environment and its relationship thereto. Map data 210 may include ground height information (e.g., terrain mapping). Map data 210 may include high-definition map information. Map data 210 may include sparse map data (e.g., lane graphs). Sensor data 204 may be fused with or used to update map data 210 in real-time or offline.

Route data 211 may describe one or more goal locations to which the autonomous vehicle is navigating. A route may include a path that includes one or more goal locations. A goal location may be indicated by a map coordinate (e.g., longitude, latitude, or other coordinate system for a map), an address, a vector A goal location may correspond to a position on a roadway, such as a position within a lane. A goal location may be selected from a continuous or effectively continuous distribution of positions in space or may be selected from a discrete set of positions. For instance, a vector-based map object may provide a continuous distribution of positions from which to select a goal. A raster-based map object may provide an effectively continuous distribution of positions from which to select a goal, subject to the resolution of the map object. A graph-based map object with a number of nodes representing discrete lane positions may provide a discrete distribution of positions from which to select a goal.

Autonomy systems 200 may process route data 211 to navigate a route. For instance, autonomy systems 200 may process route data 211 to generate instructions for navigating to a next goal location. The instructions for navigating may be explicit, such as designated points at which the vehicle is to exit a highway to enter a surface street. The instructions for navigating may be implicit, such as by encoding the instructions as costs used to bias inherent planning decisions of the vehicle to follow the route.

Localization system 230 may provide an autonomous platform 110 with an understanding of its location and orientation in an environment. In some examples, localization system 230 may support one or more other subsystems of autonomy system 200, such as by providing a unified local reference frame for performing, e.g., perception operations, planning operations, or control operations.

Localization system 230 may determine a current position of autonomous platform 110. A current position may include a global position (e.g., respecting a georeferenced anchor) or relative position (e.g., respecting objects in the environment). The localization system 230 may generally include or interface with any device or circuitry for analyzing a position or change in position of an autonomous platform 110 (e.g., autonomous ground-based vehicle). For example, the localization system 230 may determine position by using one or more of: inertial sensors (e.g., inertial measurement unit(s)), a satellite positioning system, radio receivers, networking devices (e.g., based on IP address), triangulation or proximity to network access points or other network components (e.g., cellular towers, Wi-Fi access points), or other suitable techniques. The position of autonomous platform 110 may be used by various subsystems of the autonomy system 200 or provided to a remote computing system (e.g., using the communication interface(s) 206).

In some implementations, the localization system 230 may register relative positions of elements of a surrounding environment of an autonomous platform 110 with recorded positions in the map data 210. For instance, the localization system 230 may process the sensor data 204 (e.g., LIDAR data, RADAR data, camera data) for aligning or otherwise registering to a map of the surrounding environment (e.g., from the map data 210) to understand the position of autonomous platform 110 within that environment. Accordingly, in some implementations, autonomous platform 110 may identify its position within the surrounding environment (e.g., across six axes) based on a search over the map data 210. In some implementations, given an initial location, the localization system 230 may update the position of autonomous platform 110 with incremental re-alignment based on recorded or estimated deviations from the initial location. In some implementations, a position may be registered within the map data 210.

In some implementations, the map data 210 may include a large volume of data subdivided into geographic tiles, such that a desired region of a map stored in the map data 210 may be reconstructed from one or more tiles. For instance, a plurality of tiles selected from the map data 210 may be stitched together by the autonomy system 200 based on a position obtained by the localization system 230 (e.g., a number of tiles selected in the vicinity of the position).

In some implementations, the localization system 230 may determine positions (e.g., relative or absolute) of one or more attachments or accessories for an autonomous platform 110. For instance, an autonomous platform 110 may be associated with a cargo platform, and the localization system 230 may provide positions of one or more points on the cargo platform. For example, a cargo platform may include a trailer or other device towed or otherwise attached to or manipulated by an autonomous platform 110, and the localization system 230 may provide for data describing the position (e.g., absolute, relative) of autonomous platform 110 as well as the cargo platform. Such information may be obtained by the other autonomy systems to help operate autonomous platform 110.

The autonomy system 200 may include the perception system 240, which may allow an autonomous platform 110 to detect, classify, and track objects and actors in its environment. Environmental features or objects perceived within an environment may be those within the field of view of sensors 202 or predicted to be occluded from sensors 202. This may include object(s) not in motion or not predicted to move (static objects) or object(s) in motion or predicted to be in motion (dynamic objects/actors).

The perception system 240 may determine one or more states (e.g., current or past state(s)) of one or more objects that are within a surrounding environment of an autonomous platform 110. For example, state(s) may describe (e.g., for a given time, time period) an estimate of a current or past location of an object (also referred to as position); current or past speed/velocity; current or past acceleration; current or past heading; current or past orientation; size/footprint (e.g., as represented by a bounding shape, object highlighting); classification (e.g., pedestrian class vs. vehicle class vs. bicycle class); the uncertainties associated therewith; other state information; or any combination thereof. In some implementations, the perception system 240 may determine the state(s) using one or more algorithms or machine-learned models configured to identify/classify objects based on inputs from sensors 202. The perception system may use different modalities of the sensor data 204 to generate a representation of the environment to be processed by the one or more algorithms or machine-learned models. In some implementations, state(s) for one or more identified or unidentified objects may be maintained and updated over time as autonomous platform 110 continues to perceive or interact with the objects (e.g., maneuver with or around, yield to). In this manner, the perception system 240 may provide an understanding about a current state of an environment (e.g., including the objects therein) informed by a record of prior states of the environment (e.g., including movement histories for the objects therein). Such information may be output as perception data 245. Perception data 245 may be used by various other systems of autonomous platform 110 (e.g., localization system 230, planning system 250) as it plans its motion through the environment.

The autonomy system 200 may include the planning system 250, which may be configured to determine how autonomous platform 110 is to interact with and move within its environment. The planning system 250 may determine one or more motion plans for an autonomous platform 110. A motion plan may include one or more trajectories (e.g., motion trajectories) that indicate a path for an autonomous platform 110 to follow. A trajectory may be of a certain length or time range. A motion trajectory may be defined by one or more waypoints (with associated coordinates). The waypoint(s) may be future location(s) for autonomous platform 110. The motion plans may be continuously generated, updated, and considered by the planning system 250.

The motion planning system 250 may determine a strategy for autonomous platform 110. A strategy may include a set of discrete decisions (e.g., yield to actor, reverse yield to actor, merge, lane change) that autonomous platform 110 makes. The strategy may be selected from a plurality of potential strategies. The selected strategy may be a lowest cost strategy as determined by one or more cost functions. The cost functions may, for example, evaluate the probability of a collision with another actor or object.

The planning system 250 may determine a desired trajectory for executing a strategy. For instance, the planning system 250 may obtain one or more trajectories for executing one or more strategies. The planning system 250 may evaluate trajectories or strategies (e.g., with scores, costs, rewards, constraints) and rank them. For instance, the planning system 250 may use forecasting output(s) that indicate interactions (e.g., proximity, intersections) between trajectories for autonomous platform 110 and one or more objects to inform the evaluation of candidate trajectories or strategies for autonomous platform 110. In some implementations, the planning system 250 may utilize static cost(s) to evaluate trajectories for autonomous platform 110 (e.g., "avoid lane boundaries," "minimize jerk," etc.). Additionally, or alternatively, the planning system 250 may utilize dynamic cost(s) to evaluate the trajectories or strategies for autonomous platform 110 based on forecasted outcomes for the current operational scenario (e.g., forecasted trajectories or strategies leading to interactions between actors, forecasted trajectories or strategies leading to interactions between actors and autonomous platform 110). The planning system 250 may rank trajectories based on one or more static costs, one or more dynamic costs, or a combination thereof. The planning system 250 may select a motion plan (and a corresponding trajectory) based on a ranking of a plurality of candidate trajectories. In some implementations, the planning system 250 may select a highest ranked candidate, or a highest ranked feasible candidate.

The planning system 250 may then validate the selected trajectory against one or more constraints before the trajectory is executed by autonomous platform 110.

To help with its motion planning decisions, the planning system 250 may be configured to perform a forecasting function. The planning system 250 may forecast future state(s) of environment 100. This may include forecasting the future state(s) of other actors in the environment. In some implementations, the planning system 250 may forecast future state(s) based on current or past state(s) (e.g., as developed or maintained by the perception system 240). In some implementations, future state(s) may be or include one or more forecasted trajectories (e.g., positions over time) of the objects in the environment, such as other actors. In some implementations, one or more of the future state(s) may include one or more probabilities associated therewith (e.g., marginal probabilities, conditional probabilities). For example, the one or more probabilities may include one or more probabilities conditioned on the strategy or trajectory options available to autonomous platform 110. Additionally, or alternatively, the probabilities may include probabilities conditioned on trajectory options available to one or more other actors.

In some implementations, the planning system 250 may perform interactive forecasting. The planning system 250 may determine a motion plan for an autonomous platform 110 with an understanding of how forecasted future states of the environment may be affected by execution of one or more candidate motion plans.

By way of example, with reference again to FIG. 1, autonomous platform 110 may determine candidate motion plans corresponding to a set of platform trajectories 112A-C that respectively correspond to the first actor trajectories 122A-C for the first actor 120, trajectories 132 for the second actor 130, and trajectories 142 for the third actor 140 (e.g., with respective trajectory correspondence indicated with matching line styles). Autonomous platform 110 may evaluate each of the potential platform trajectories and predict its impact on the environment.

For example, autonomous platform 110 (e.g., using its autonomy system 200) may determine that a platform trajectory 112A would move autonomous platform 110 more quickly into the area in front of the first actor 120 and is likely to cause the first actor 120 to decrease its forward speed and yield more quickly to autonomous platform 110 in accordance with a first actor trajectory 122A.

Additionally, or alternatively, autonomous platform 110 may determine that a platform trajectory 112B would move autonomous platform 110 gently into the area in front of the first actor 120 and, thus, may cause the first actor 120 to slightly decrease its speed and yield slowly to autonomous platform 110 in accordance with a first actor trajectory 122B.

Additionally, or alternatively, autonomous platform 110 may determine that a platform trajectory 112C would cause the autonomous vehicle to remain in a parallel alignment with the first actor 120 and, thus, the first actor 120 is unlikely to yield any distance to autonomous platform 110 in accordance with first actor trajectory 122C.

Based on comparison of the forecasted scenarios to a set of desired outcomes (e.g., by scoring scenarios based on a cost or reward), the planning system 250 may select a motion plan (and its associated trajectory) in view of the interaction of autonomous platform 110 with the environment 100. In this manner, for example, autonomous platform 110 may achieve at least a technical improvement that interleaves its forecasting and motion planning functionality.

To implement selected motion plan(s), the autonomy system 200 may include a control system 260 (e.g., a vehicle control system). Generally, the control system 260 may provide an interface between the autonomy system 200 and the platform control devices 212 for implementing the strategies and motion plan(s) generated by the planning system 250. For instance, control system 260 may implement the selected motion plan/trajectory to control the motion of autonomous platform 110 through its environment by following the selected trajectory (e.g., the waypoints included therein). The control system 260 can, for example, translate a motion plan into instructions for the appropriate platform control devices 212 (e.g., acceleration control, brake control, steering control). By way of example, the control system 260 may translate a selected motion plan into instructions to adjust a steering component (e.g., a steering angle) by a certain number of degrees, apply a certain magnitude of braking force, increase/decrease speed In some implementations, the control system 260 may communicate with the platform control devices 212 through communication channels including, for example, one or more data buses (e.g., controller area network (CAN)), onboard diagnostics connectors (e.g., OBD-II), or a combination of wired or wireless communication links. The platform control devices 212 may send or obtain data, messages, signals to or from the autonomy system 200 (or vice versa) through the communication channel(s).

The autonomy system 200 may receive, through communication interface(s) 206, assistive signal(s) from remote assistance system 270. Remote assistance system 270 may communicate with the autonomy system 200 over a network (e.g., as a remote system 160 over network 170). In some implementations, the autonomy system 200 may initiate a communication session with the remote assistance system 270. For example, the autonomy system 200 may initiate a session based on or in response to a trigger. In some implementations, the trigger may be an alert, an error signal, a map feature, a request, a location, a traffic condition, a road condition After initiating the session, the autonomy system 200 may provide context data to the remote assistance system 270. The context data may include sensor data 204 and state data of autonomous platform 110. For example, the context data may include a live camera feed from a camera of autonomous platform 110 and the current speed of autonomous platform 110. An operator (e.g., human operator) of the remote assistance system 270 may use the context data to select one or more assistive signals. The assistive signal(s) may provide values or adjustments for various operational parameters or characteristics for the autonomy system 200. For instance, the assistive signal(s) may include way points (e.g., a path around an obstacle, lane change), velocity or acceleration profiles (e.g., speed limits), relative motion instructions (e.g., convoy formation), operational characteristics (e.g., use of auxiliary systems, reduced energy processing modes), or other signals to assist the autonomy system 200.

Autonomy system 200 may use the assistive signal(s) for input into one or more autonomy subsystems for performing autonomy functions. For instance, the planning system 250 may receive the assistive signal(s) as an input for generating a motion plan. For example, assistive signal(s) may include constraints for generating a motion plan. Additionally, or alternatively, assistive signal(s) may include cost or reward adjustments for influencing motion planning by the planning system 250. Additionally, or alternatively, assistive signal(s) may be considered by the autonomy system 200 as suggestive inputs for consideration in addition to other received data (e.g., sensor inputs).

The autonomy system 200 may be platform agnostic, and the control system 260 may provide control instructions to platform control devices 212 for a variety of different platforms for autonomous movement (e.g., a plurality of different autonomous platform 110s fitted with autonomous control systems). This may include a variety of different types of autonomous vehicles (e.g., sedans, vans, SUVs, trucks, electric vehicles, combustion power vehicles) from a variety of different manufacturers/developers that operate in various different environments and, in some implementations, perform one or more vehicle services.

Figure 3A:
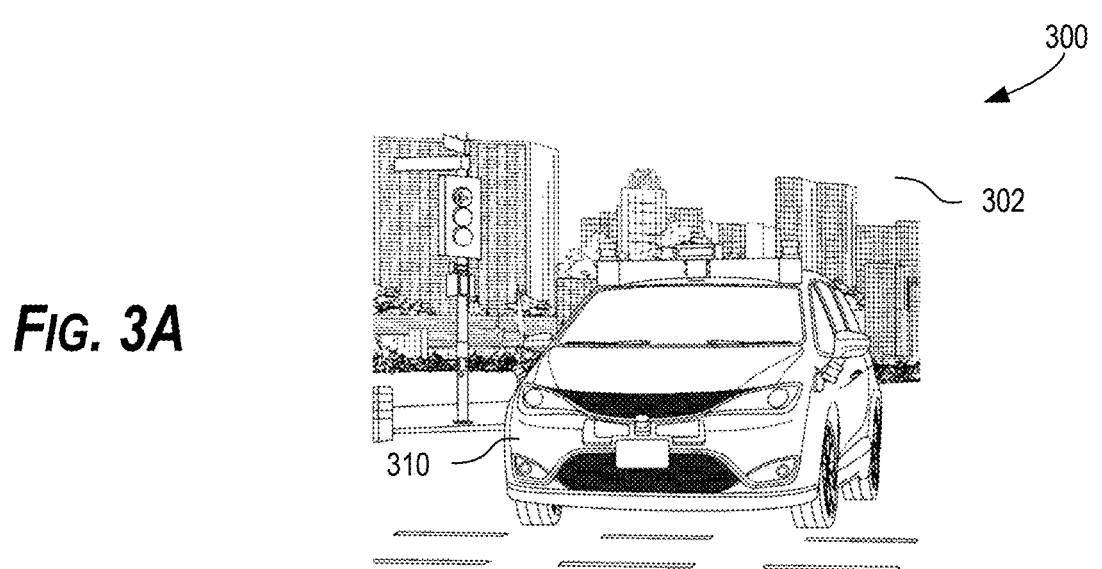
FIG. 3A is a representation of an example operational environment, according to some implementations of the present disclosure.

For example, with reference to FIG. 3A, an operational environment 300 may include a dense environment 302. An autonomous platform 110 may include an autonomous vehicle 310 controlled by the autonomy system 200. In some implementations, the autonomous vehicle 310 may be configured for maneuverability in dense environment 302, such as with a configured wheelbase or other specifications. In some implementations, the autonomous vehicle 310 may be configured for transporting cargo or passengers. In some implementations, the autonomous vehicle 310 may be configured to transport numerous passengers (e.g., a passenger van, a shuttle, a bus). In some implementations, the autonomous vehicle 310 may be configured to transport cargo, such as large quantities of cargo (e.g., a truck, a box van, a step van) or smaller cargo (e.g., food, personal packages).

Figure 3B:
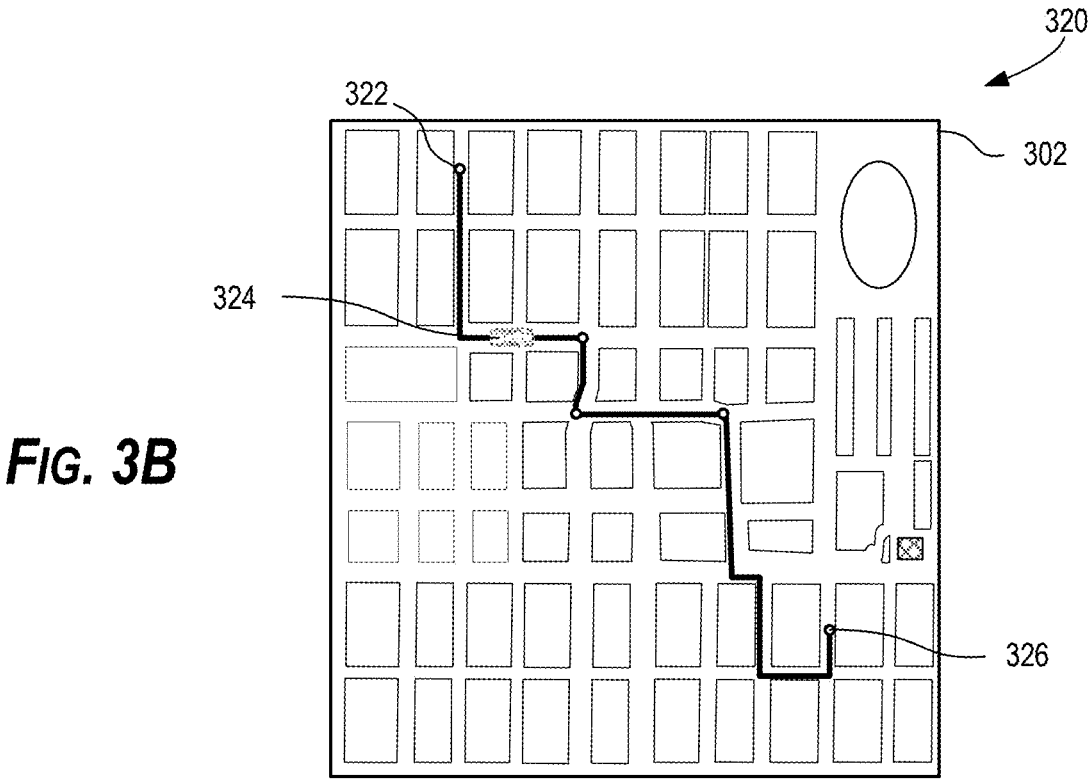
FIG. 3B is a representation of an example map of an operational environment, according to some implementations of the present disclosure.

With reference to FIG. 3B, a selected overhead view 320 of the dense environment 302 is shown overlaid with an example trip/service between a first location 322 and a second location 326. The example trip/service may be assigned, for example, to an autonomous vehicle 324 by a remote computing system. The autonomous vehicle 324 may be, for example, the same type of vehicle as autonomous vehicle 310. The example trip/service may include transporting passengers or cargo between the first location 322 and the second location 326. In some implementations, the example trip/service may include travel to or through one or more intermediate locations, such as to onload or offload passengers or cargo. In some implementations, the example trip/service may be prescheduled (e.g., for regular traversal, such as on a transportation schedule). In some implementations, the example trip/service may be on-demand (e.g., as requested by or for performing a taxi, rideshare, ride hailing, courier, delivery service).

Figure 3C:
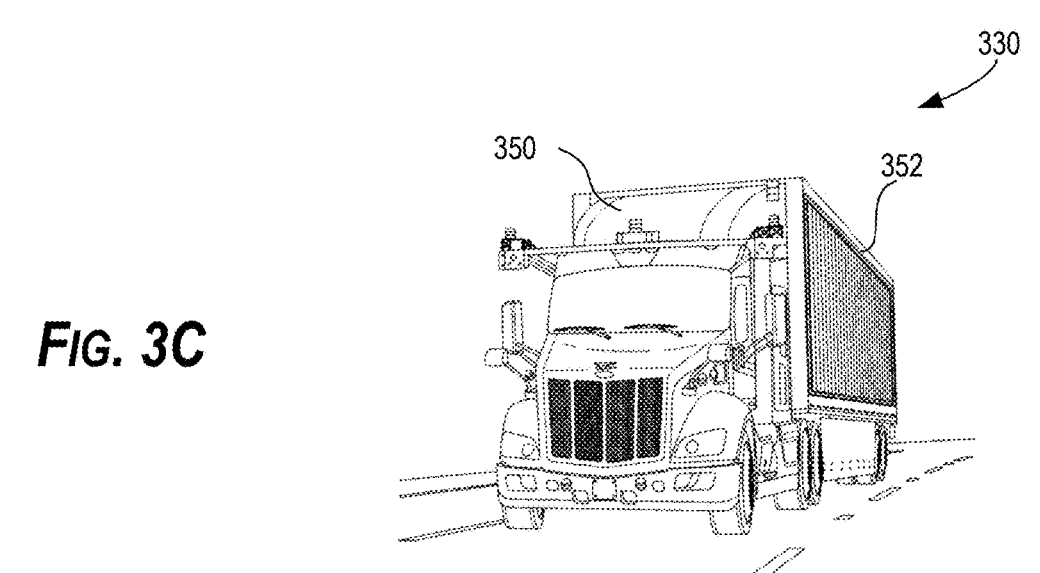
FIG. 3C is a representation of an example operational environment, according to some implementations of the present disclosure.

With reference to FIG. 3C, in another example, an operational environment may include an open travel way environment 330. An autonomous platform 110 may include an autonomous vehicle 350 controlled by the autonomy system 200. This may include an autonomous tractor for an autonomous truck. In some implementations, the autonomous vehicle 350 may be configured for high payload transport (e.g., transporting freight or other cargo or passengers in quantity), such as for long distance, high payload transport. For instance, the autonomous vehicle 350 may include one or more cargo platform attachments such as a trailer 352. Although depicted as a towed attachment in FIG. 3C, in some implementations one or more cargo platforms may be integrated into (e.g., attached to the chassis of) the autonomous vehicle 350 (e.g., as in a box van, step van).

Figure 3D:
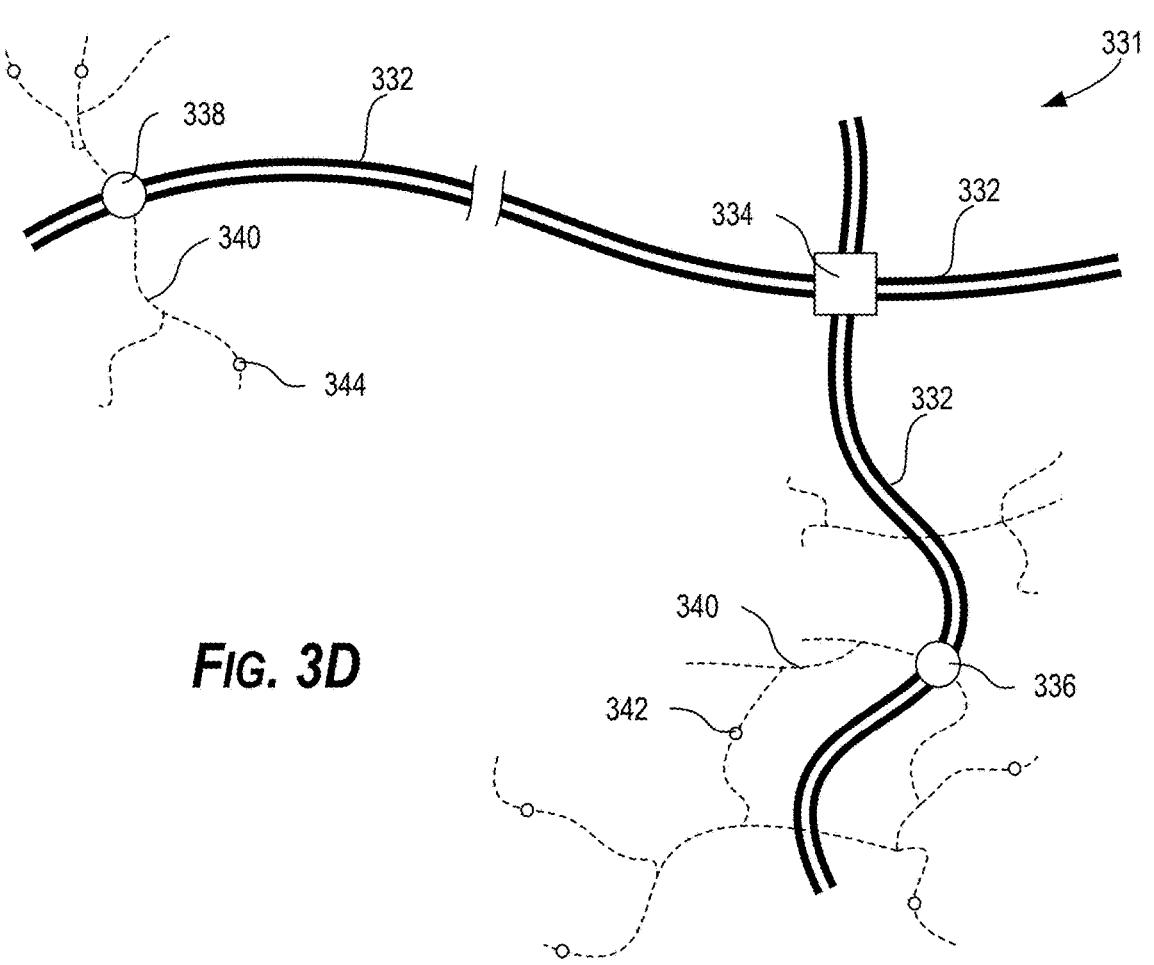
FIG. 3D is a representation of an example map of an operational environment, according to some implementations of the present disclosure.

With reference to FIG. 3D, a selected overhead view 331 of open travel way environment 330 is shown, including travel ways 332, an interchange 334, transfer hubs 336 and 338, access travel ways 340, and locations 342 and 344. In some implementations, an autonomous vehicle (e.g., the autonomous vehicle 310 or the autonomous vehicle 350) may be assigned an example trip/service to traverse the one or more travel ways 332 (optionally connected by the interchange 334) to transport cargo between the transfer hub 336 and the transfer hub 338. For instance, in some implementations, the example trip/service includes a cargo delivery/transport service, such as a freight delivery/transport service. The example trip/service may be assigned by a remote computing system. In some implementations, the transfer hub 336 may be an origin point for cargo (e.g., a depot, a warehouse, a facility) and the transfer hub 338 may be a destination point for cargo (e.g., a retailer). However, in some implementations, the transfer hub 336 may be an intermediate point along an ultimate journey of a cargo item between its respective origin and its respective destination. For instance, an origin of a cargo item may be situated along the access travel ways 340 at the location 342. The cargo item may accordingly be transported to transfer hub 336 (e.g., by a human-driven vehicle, by the autonomous vehicle 310) for staging. At the transfer hub 336, various cargo items may be grouped or staged for longer distance transport over the travel ways 332.

In some implementations of an example trip/service, a group of staged cargo items may be loaded onto an autonomous vehicle (e.g., the autonomous vehicle 350) for transport to one or more other transfer hubs, such as the transfer hub 338. For instance, although not depicted, it is to be understood that the open travel way environment 330 may include more transfer hubs than the transfer hubs 336 and 338 and may include more travel ways 332 interconnected by more interchanges 334. A simplified map is presented here for purposes of clarity only. In some implementations, one or more cargo items transported to the transfer hub 338 may be distributed to one or more local destinations (e.g., by a human-driven vehicle, by the autonomous vehicle 310), such as along the access travel ways 340 to the location 344. In some implementations, the example trip/service may be prescheduled (e.g., for regular traversal, such as on a transportation schedule). In some implementations, the example trip/service may be on-demand (e.g., as requested by or for performing a chartered passenger transport or freight delivery service).

To improve the operation of autonomous platforms, such as an autonomous vehicle (e.g., autonomous platform 110) controlled at least in part using autonomy system 200 (e.g., the autonomous vehicles 310 or 350), example aspects of the present disclosure provide improved motion planning systems and techniques.

Figure 4:
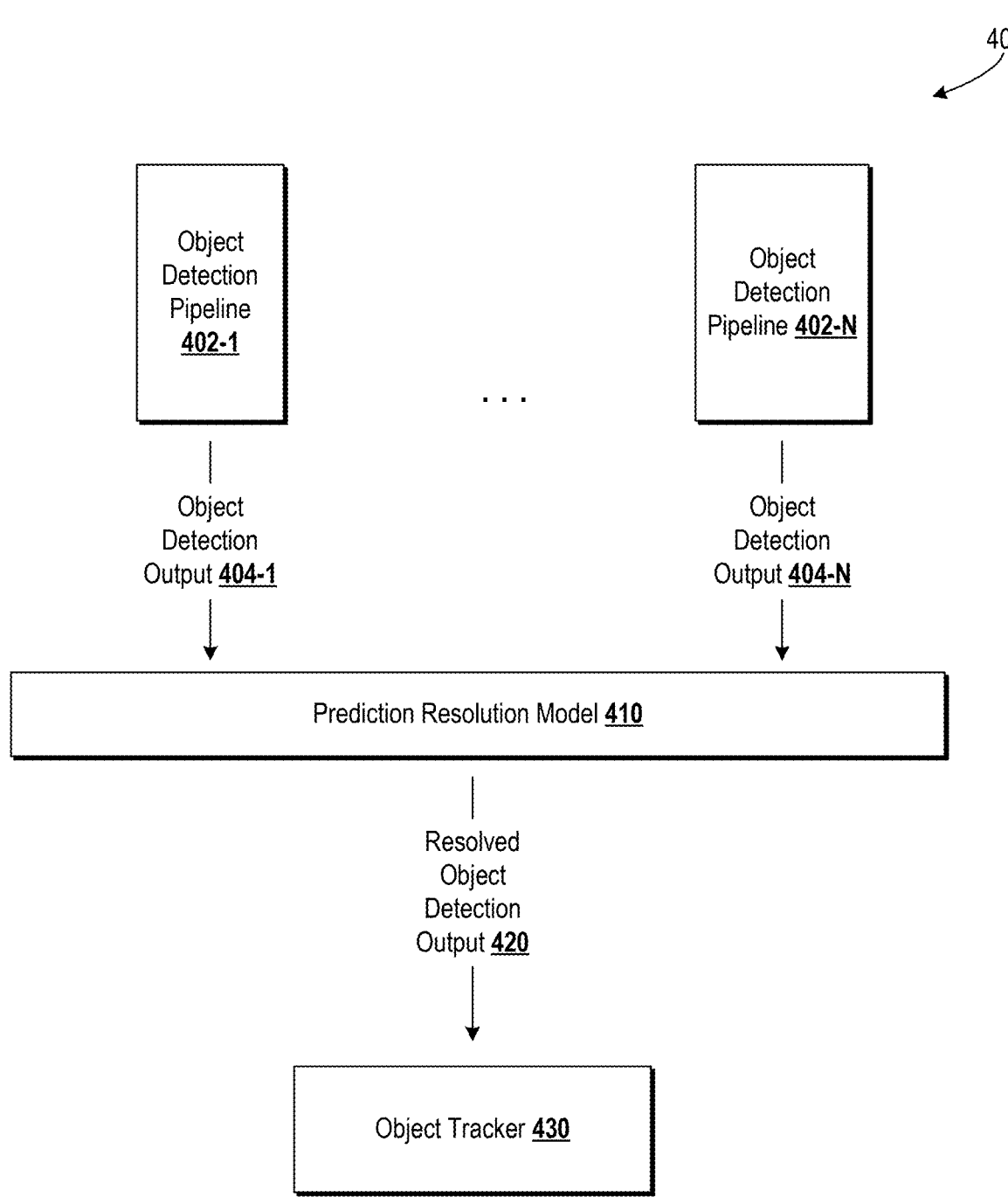
FIG. 4 is a block diagram of aspects of an example system, according to some implementations of the present disclosure.

FIG. 4 is a block diagram of an example system 400 for resolving prediction outputs from multiple object detection pipelines of a perception system (e.g., perception system 240). Multiple object detection pipelines 402-1, . . . , 402-N may generate multiple object detection outputs 404-1, . . . , 404-N, respectively. A prediction resolution model 410 may receive object detection outputs 404-1, . . . , 404-N and generate a resolved object detection output 420. An object tracker 430 may receive resolved object detection output 420 to update information for one or more tracked objects in the environment.

Object detection pipelines 402-1, . . . , 402-N may access one or more sensors or devices configured to generate signals indicating a presence of or attributes of objects in an environment. Object detection pipelines 402-1, . . . , 402-N may access the same sensors, different sensors, or overlapping subsets of sensors. Each of object detection pipelines 402-1, . . . , 402-N may access a single sensor or multiple sensors. Each of object detection pipelines 402-1, . . . , 402-N may be configured for different sensing tasks. For instance, a pipeline may be configured for long-range sensing tasks (e.g., using cameras with lenses having longer focal lengths or with higher resolution). A pipeline may be configured for standard range sensing tasks (e.g., using LIDAR, RADAR, camera, or fusions thereof).

A pipeline may be configured to use sensors having a limited field of view that may be different from another field of view of sensors of another pipeline. For example, a total field of view around a vehicle may be 360 degrees. A first pipeline may have a field of view of 90 degrees. A second pipeline may have a field of view of 180 degrees. A third pipeline may have a field of view of 45 degrees. The field of view can be affected by a sensor used by the pipeline. A sensor may have an optical, mechanical, software, or other configuration attribute that defines an angular sweep of the environment over which it is operable to provide sensed data.

Object detection pipelines 402-1, . . . , 402-N may operate to process sensor data describing portions or regions of an environment. Object detection pipelines 402-1, . . . , 402-N may process sensor data describing the same portions or regions of an environment. Object detection pipelines 402-1, . . . , 402-N may process sensor data describing the different portions or regions of an environment. The portions may overlap or be disjoint. In an example, the portions may overlap at least in sensor data describing the object. For instance, in an example the pipelines may each process sensor data describing the object so as to provide different predictions regarding the object (or a determination not to return a prediction for the object).

Object detection pipelines 402-1, . . . , 402-N may include processing components (e.g., hardware devices, software services or routines) configured to process the signals to recognize the indications of the presence of or attributes of objects in the environment. Object detection pipelines 402-1, . . . , 402-N may access the same processing components, different processing components, or overlapping subsets of processing components. Each of object detection pipelines 402-1, . . . , 402-N may access a single processing component or multiple processing components. Each of object detection pipelines 402-1, . . . , 402-N may be configured for different processing tasks. For instance, a pipeline may be configured for sensor fusion. A pipeline may be configured to update existing object tracking data (e.g., a record of prior object detections over time for an object). A pipeline may be configured to generate new detections not conditioned on prior detection records.

Object detection pipelines 402-1, . . . , 402-N may include one or more object detection models. Object detection pipelines 402-1, . . . , 402-N may include one or more machine-learned models. Object detection pipelines 402-1, . . . , 402-N may access the same machine-learned models, different machine-learned models, or overlapping subsets of machine-learned models. Each of object detection pipelines 402-1, . . . , 402-N may access a single machine-learned model or multiple machine-learned models.

Object detection outputs 404-1, . . . , 404-N may include structured data objects that describe the recognized indications of the presence of or attributes of objects in the environment. For example, object outputs 404-1, . . . , 404-N may include object detection data in a standardized format that other autonomy system components may access, decode, and use in downstream processes. For example, object outputs 404-1, . . . , 404-N may include object detection data in a string-based representation (e.g., JSON) published via one or more application programming interfaces (APIs) established between various system components or services. Object outputs 404-1, . . . , 404-N may include object detection data in other object-based representations or messages.

Object detection outputs 404-1, . . . , 404-N may include classification outputs that indicate an object class. Object detection outputs 404-1, . . . , 404-N may include distribution outputs that indicate a distribution of scores (e.g., probability distribution) over multiple output classes. Object detection outputs 404-1, . . . , 404-N may include logit values for multiple output classes.

Object detection outputs 404-1, . . . , 404-N may be generated by prediction resolution model 410 based on latent output values from respective pipelines. For instance, prediction resolution model 410 may access latent states within object detection pipelines 402-1, . . . , 402-N and process the latent states using a category prediction output head to generate a distribution of logits over output categories. Similarly, object detection pipelines 402-1, . . . , 402-N may themselves contain category prediction output heads that generate a distribution of logits over output categories.

Prediction resolution model 410 may be or include one or more devices, services, routines, or other processing components configured to process object detection outputs 404-1, . . . , 404-N and resolve any discrepancies therebetween. Prediction resolution model 410 may include one or more machine-learned models that contain parameters trained over a training dataset. Prediction resolution model 410 may apply resolution logic to separately adjust an influence of any particular object detection output. For instance, older detection outputs may be discounted as compared to newer detection outputs. Certain pipelines may have preference over others (e.g., due to higher accuracy), and outputs from the preferred pipelines may be prioritized over outputs from the others.

In an example, prediction resolution model may compute logit values over a set of possible output classifications for an object. A logit value may be a tensor of values, with a value in the tensor associated with each candidate output category. Initial votes from each pipeline may each contain initial logit values based on the output received from that pipeline. The votes may be combined according to the resolution logic of prediction resolution model 410. For example, logit values from each of the votes may be combined in a weighted combination, with the weights determined by the resolution logic. The weights may be learned parameters of prediction resolution model 410.

In an example, logit values from each pipeline are normalized for combination. For example, the logit values may be passed through a softmax function so that distributions from each pipeline may be combined or compared.

In an example, logit values from each pipeline are not normalized for combination. For example, the combined logit values may be passed through a softmax function after combination so that the native magnitudes of the logits from each pipeline may carry through the resolution process.

In an example, a set of pipelines may be represented as a set S. A resolution object u may capture attributes of a given output of the pipeline and the pipeline itself. For instance, u may include an age of an output (e.g., a real-numbered age value), an order in which the output was received (e.g., an integer ordinal with respect to others in a queue), a source of the output (e.g., a numerical, textual, or otherwise formatted identifier of the pipeline from which the output was received). The resolution object u may indicate the logit values for the object detection output (e.g., a tensor of real-valued logit values).

Prediction resolution model 410 may associate the object u with a weight value. The weight value may include a tensor of weights for individual logits within u or may include a single weight value across the set of logits. In an example, a weight may be adjusted based on an age of u or an order of u. For instance, a weight may be computed as a product of some initial weight value a, an age factor (e.g., that varies exponentially with age, such as to decrease a weight of older predictions), and an order factor (e.g., that varies exponentially with ordinal value, such as to decrease a weight of less recent predictions).

If a particular pipeline does not have a detection result for a particular object that was detected by another model, prediction resolution model 410 may inject a negative observation detection result from the particular pipeline for the purpose of comparison. For instance, a negative observation may be a one-hot vector with an indication that the object is "generic" (e.g., an object that is not a member of another class).

The resolution objects u may be combined according to the weights.

Prediction resolution model 410 may include a linear output layer to perform the resolution logic. For example, a combination may be a linear weighted combination across the resolution objects u for each logit category to obtain an overall logit tensor. This logit tensor may be normalized using softmax to obtain a probability distribution. The index with the highest value (e.g., logit value, probability value) may be selected using greedy sampling as the resolved detection output. Prediction resolution model 410 may output a distribution over output classes, such as by outputting the logit tensor (or a normalized version thereof).

Parameters of prediction resolution model 410 may be trained over a training dataset. Prediction resolution model 410 may learn one or more learnable parameters by optimizing over a dataset of unit tests. The unit tests may include examples of conflicting predictions from different object detection pipelines. For example, a unit test may include a set of scenarios in which multiple object detection pipelines exhibit confusion between object categories. Prediction resolution model 410 may learn values for one or more learnable parameters by fitting its resolved outputs to the known correct labels of the unit tests. For instance, the prediction resolution model may undergo an optimization routine to determine weight values that cause the resolved object detection output for each unit test to correspond to the known value for that test. Using unit tests to self-calibrate may simplify and accelerate the refinement of an autonomous vehicle perception system. As different object detection pipelines are developed and updated over time, the prediction resolution model may re-calibrate over the dataset to learn new weightings. For instance, as updated pipelines improve performance on different tasks, the prediction resolution model may update learned weightings to reflect increased confidence or priority for outputs from those improved pipelines.

For example, parameters used in the weighted combination of resolution objects u may be learned in training. Prediction resolution model 410 may be trained with a global optimizer (e.g., not using min-batches). To decrease a memory footprint of global optimization while maintaining a rich training dataset, the data may be downsampled. Training examples may be binned based on a type of confusion (e.g., based on pairwise class confusion, such as a bin for "Pred: Vehicle; Act: Generic" and a bin for "Pred: Generic; Act: Vehicle").

The bins may be weighted and downsampled in an amount correlated to the bin weight. In an example, a ratio of a number of a respective category of examples in the batch to a number of the respective category in the full dataset may be inversely correlated with an error rate associated with the respective category. For instance, samples for which all pipelines agree may be first discarded or deactivated so that the remaining examples present conflicts to be resolved. Similarly, bins that contain common errors may be present in higher proportions as compared to bins that contain less common errors.

In training, the loss computed over the bins may be adjusted to reflect the actual frequency of the bin type in the full population. For instance, if a bin representing 100,000 examples in the full population is downsampled to 10,000, the loss may be multiplied by 10 to extrapolate the performance over the downsampled portion to that over the full bin.

Parameters of prediction resolution model 410 may be constrained during training to not flip signs. This may enforce the inductive prior that all prediction contributes positively to the overall resolved prediction. For instance, such a constraint may enforce a presumption that a prediction by a pipeline for a class does not make that class actually less likely.

Resolved object detection output 420 may include structured data objects that describe the recognized indications of the presence of or attributes of objects in the environment. For example, resolved object detection output 420 may include object detection data in a standardized format that other autonomy system components may access, decode, and use in downstream processes. For example, resolved object detection output 420 may include object detection data in a string-based representation (e.g., JSON) published via one or more application programming interfaces (APIs) established between various system components or services. Resolved object detection output 420 may include object detection data in other object-based representations or messages.

Resolved object detection output 420 may include classification outputs that indicate an object class. Resolved object detection output 420 may include distribution outputs that indicate a distribution of scores (e.g., probability distribution) over multiple output classes. Resolved object detection output 420 may include logit values for multiple output classes.

Object tracker 430 may be or include one or more devices, services, routines, or other processing components configured to record and track objects over time. Object tracker 430 may receive object detection data from one or more object detection pipelines directly. For example, object detection pipelines may update object tracks of object tracker 430. Prediction resolution model 410 may periodically execute to resolve the predictions (e.g., resolve conflicts or confirm agreements).

Figure 5:
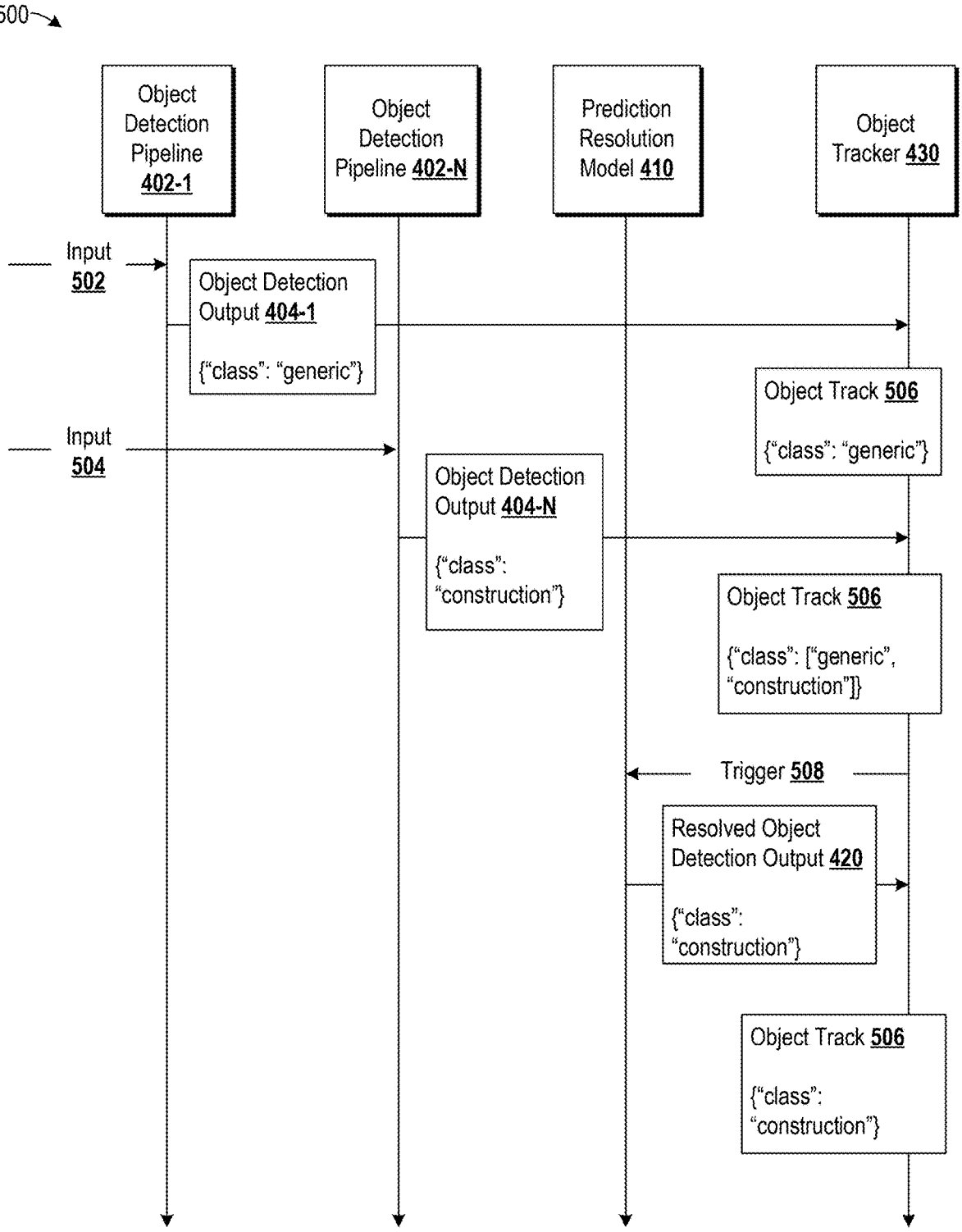
FIG. 5 is a block diagram of aspects of an example system, according to some implementations of the present disclosure.

FIG. 5 is a block diagram of an example communication timeline 500. For example, object detection pipeline 402-1 may receive at a first time an input 502 from one or more sensor systems. Input 502 may include data descriptive of an object in an environment. Based on input 502, object detection pipeline 402-1 may generate object detection output 404-1 that indicates that the object class is "generic." For instance, the object may be too far away to discern an exact classification. Object detection pipeline 402-1 may output object detection output 404-1. Object tracker 430 may receive object detection output 404-1 and initialize and update an object track 506 that records the presence of the object and its current classification.

At a later time, object detection pipeline 402-N may receive an input 504 from one or more sensor systems. Input 504 may include data descriptive of the object. Based on input 504, object detection pipeline 402-N may generate object detection output 404-N that indicates that the object class is "construction." For instance, the input modalities ingested by object detection pipeline 402-N may have better long-range acuity as compared to object detection pipeline 402-1. Object detection pipeline 402-N may output object detection output 404-N. Object tracker 430 may receive object detection output 404-N and update object track 506 that records the presence of the object and its current classifications.

At a later time, prediction resolution model 410 may receive a trigger 507 to initiate a resolution cycle. Prediction resolution model 410 may process object detection outputs 402-1, . . . , 402-N and generate resolved object detection output 420. Object tracker 430 may receive resolved object detection output 420 and update object track 506 to reflect the resolved object classification.

Object track 506 may record movement of an object within an environment over time. An example object track stores a series of keypoints indicating the current and one or more past locations of the object within the environment. Object track 506 may indicate the object category and the dynamics of the object. Object track 506 may include or be implemented using one or more structured data objects that store object tracking data.

Object track 506 may store classification values for the object from one or multiple pipelines. For example, an object track may store multiple unresolved class labels from multiple pipelines. As an alternative, unresolved outputs from multiple different pipelines may be stored as separate object tracks that share an identifier that facilitates grouping of the separate object tracks as part of an unresolved group.

Object track 506 may store logit values received from different object detection pipelines. The stored logit values associated with a given update (e.g., the most recent update) may be cached for provision to prediction resolution model 410 for resolving object detection outputs 404-1, . . . , 404-N.

Trigger 508 may be generated by object tracker 430 or by another component. Trigger 508 may be a temporal or ordinal trigger within or external to prediction resolution model 410 that causes prediction resolution model 410 to execute periodically when new outputs are available to resolve. Trigger 508 may correspond to a fixed frequency of execution. For example, object detection outputs (or indicators thereof) may accumulate in a queue. Prediction resolution model 410 may periodically execute on the queue (e.g., over all the items in the queue or over a subset of items in the queue according to a first-in-first-out scheme).

Figure 6:
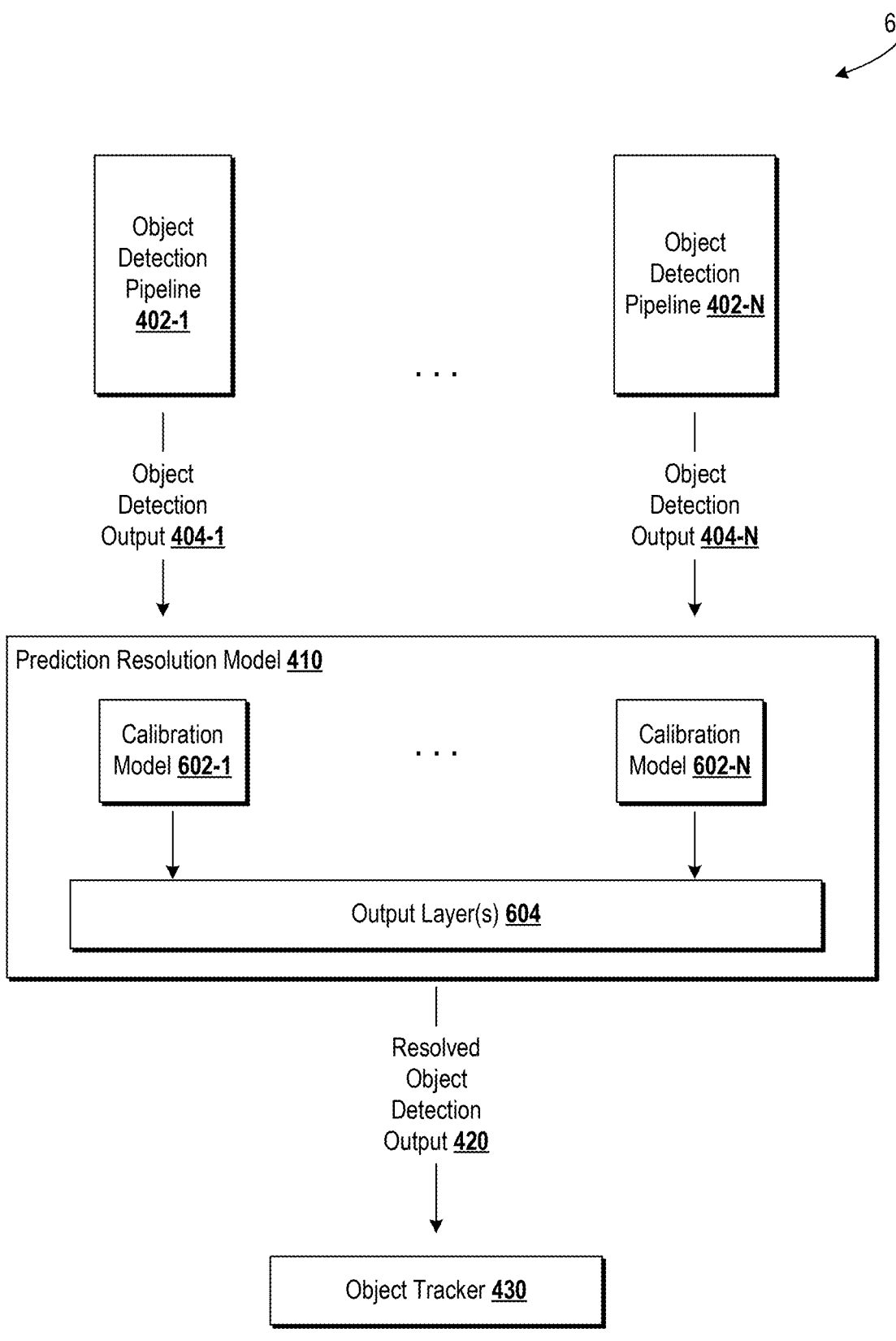
FIG. 6 is a block diagram of aspects of an example system, according to some implementations of the present disclosure.

FIG. 6 is a block diagram of an example system 600 in which prediction resolution model 410 contains one or more calibration model(s) (e.g., calibration models 602-1, . . . , 602-N respectively for pipelines 402-1, . . . , 402-N). The calibrated outputs may pass through one or more output layers 604. Output layer(s) 604 may be a linear output layer. Output layer(s) 604 may include learnable parameters to perform a linear combination of calibrated model outputs, as described above with respect to FIG. 4.

Calibration model(s) 602-1, . . . , 602-N may adapt pipeline outputs to conform to a desired behavioral profile or to conform to a desired format.

For example, a calibration model may reshape a predicted output distribution using a mapping function optimized over a training dataset. For example, an object detection pipeline may be trained using a particular loss function for a particular detection task over a particular training dataset. That training dataset, loss function, or task may not be representative of the object tracking task of object tracking system 430. For example, an object tracking system may be more sensitive to false positives, or more sensitive to detections of a particular class of object.

In an example, a detection pipeline outputs a logit tensor over output classes. Each value of the logit tensor may be passed through a calibration model associated with the detection pipeline. The calibration model may output a new logit value for each value of the logit tensor. The calibration model can, for example, apply a linear or nonlinear transform on the initial value to generate the calibrated value. For example, the calibration model may include a mapping function from raw logit values to calibrated logit values. The mapping function may be a piecewise linear function. The mapping function may include learned parameters. The parameters may be learned jointly with the parameters of output layer(s) 604.

In an example, a detection pipeline outputs a classification output value (e.g., a single enumerated class value, a one-hot classification tensor).

Figure 7:
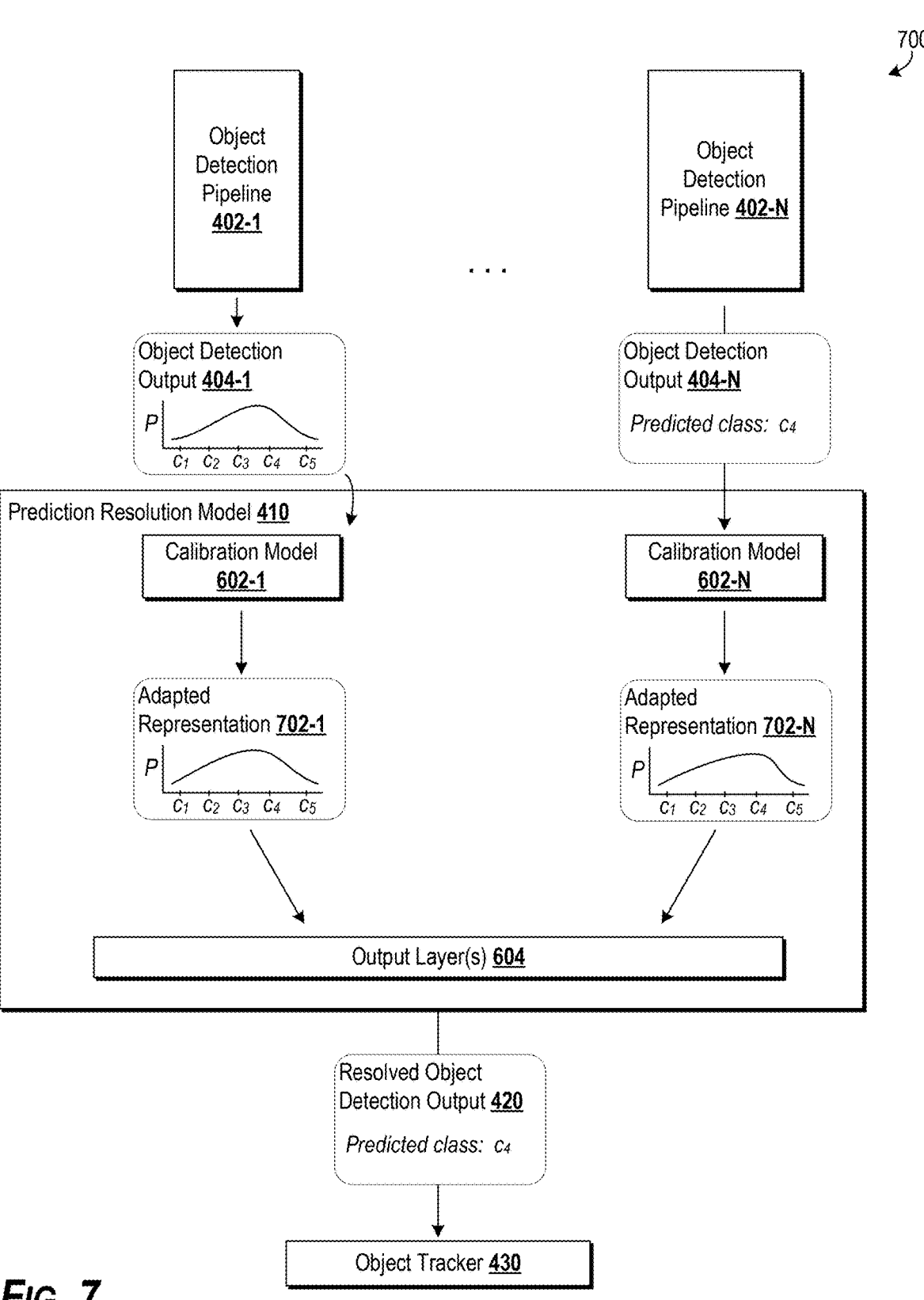
FIG. 7 is a block diagram of aspects of an example system, according to some implementations of the present disclosure.

FIG. 7 is a block diagram of an example system 700 in which prediction resolution model 410 receives a first object detection output 404-1 that indicates a distribution over object categories and receives a second object detection output 404-N that indicates a single class. Prediction resolution model 410 may execute calibration model 602-1 on object detection output 404-1 to generate adapted representation 702-1. Calibration model 602-1 may reshape or otherwise adjust the distribution in output detection 404-1.

Prediction resolution model 410 may execute calibration model 602-N on object detection output 404-N to generate adapted representation 702-N. Calibration model 602-N may adapt output detection object 404-N into a distribution representation. For example, calibration model 602-N may include a machine-learned model trained to predict an expected distribution over output categories based on object detection output 404-N.

An adapted representation of a single-class output may be generated based on a record of observed predictions. For example, for a given pipeline, a set of trials may be executed. Any errors in classification by the pipeline over this test set may indicate that, for any given output, there is some likelihood that the true value might be a different class. The probabilities for each different class may be computed by evaluating what the true class is for each erroneous classification output. By observing pipeline failures over a set of test trials, for instance, it may be determined that, if the pipeline indicates class A, there is an M % chance the class is B, an 0% chance the class is C, etc. For instance, for every 1000 times the pipeline outputs a "generic" class, 10 times it is actually "construction," 5 times it is actually "vehicle." It may be approximated then that, for that pipeline, if it outputs "generic" for an object, there is a 1% chance of the object actually being "construction" and 0.5% chance of the object actually being "vehicle." Logit tensors representative of these likelihoods may be precomputed and stored in a data structure. In this manner, using a history of observed behavior, a single-class output may be adapted into a logit tensor.

Figure 8:
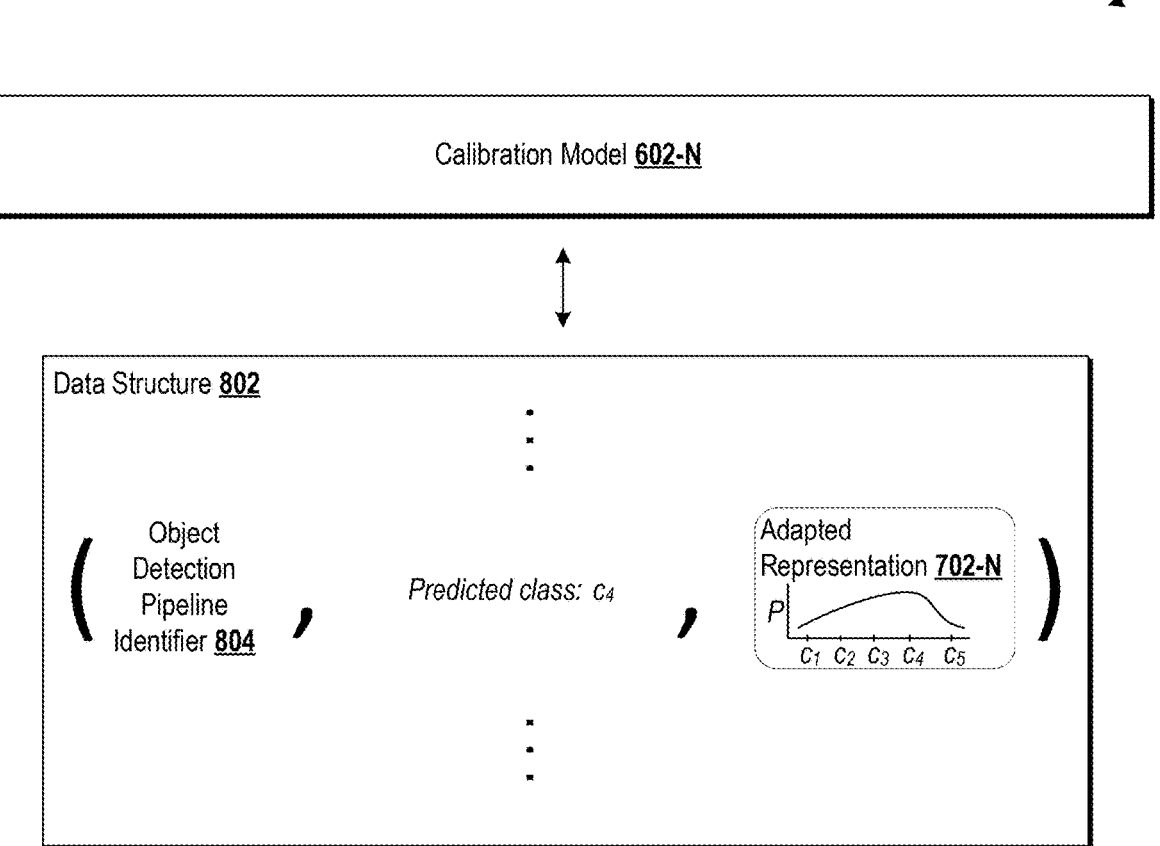
FIG. 8 is a block diagram of aspects of an example system, according to some implementations of the present disclosure.

FIG. 8 is a block diagram 800 of an example data structure 802 that calibration model 602-N may query to obtain an adapted representation 702-N. The logit tensors may be indexed based on an object detection pipeline identifier 804 and a predicted class. In this manner, for a given prediction value from a given pipeline, calibration model 602-N may obtain an expected distribution over class values. In this manner, for instance, calibration model 602-N may provide the adapted representation 702-N in a shared output space with other distribution representations for computing weighted combinations of the score or logit values.

FIG. 9 is a flowchart of an example method 900 according to aspects of the present disclosure. One or more portions of example method 900 may be implemented by the computing systems described with reference to the other figures (e.g., autonomous platform 110, vehicle computing system 180, remote system 160, a system of FIGS. 1 to 13). Each respective portion of example method 900 may be performed by any (or any combination) of one or more computing devices. Moreover, one or more portions of example method 900 may be implemented on the hardware components of the devices described herein (e.g., as in FIGS. 1 to 13).

FIG. 9 depicts elements performed in a particular order for purposes of illustration and discussion. Those of ordinary skill in the art, using the disclosures provided herein, will understand that the elements of any of the methods discussed herein may be adapted, rearranged, expanded, omitted, combined, or modified in various ways without deviating from the scope of the present disclosure. FIG. 9 is described with reference to elements/terms described with respect to other systems and figures for exemplary illustrated purposes and is not meant to be limiting. One or more portions of example method 900 may be performed additionally, or alternatively, by other systems.

At 902, example method 900 may include generating, by a first object detection model of a perception system of an autonomous vehicle and based on a first portion of sensor data describing a first portion of an environment of the autonomous vehicle, a first object detection output that includes a first predicted class for an object. For example, object detection pipeline 402-N may include a first object detection model. Object detection pipeline 402-N may use the first object detection model to process a portion of sensor data describing a portion of an environment. The portion of the environment may include the object. Object detection pipeline 402-N may output object detection output 404-N for the object. Object detection output 404-N may include a predicted class for the object.

At 904, example method 900 may include generating, by a second object detection model of the perception system and based on a second portion of sensor data describing a second portion of the environment, a second object detection output that includes a predicted distribution over candidate classes for the object. For example, object detection pipeline 402-1 may include a second object detection model. Object detection pipeline 402-1 may use the second object detection model to process a portion of sensor data describing a portion of an environment. The portion of the environment may include the object. The sensor data may be the same as, overlapping with, or disjoint from the sensor data processed by the first object detection model. Object detection pipeline 402-1 may output object detection output 404-1 for the object. Object detection output 404-1 may include a predicted distribution over candidate classes for the object. For example, the predicted distribution over candidate classes may include scores or logit values respectively associated with each of a plurality of candidate classes.

At 906, example method 900 may include adapting, by a prediction resolution model, at least a portion of the first object detection output into an adapted representation of the first object detection output. For example, prediction resolution model 410 may adapt a distribution of object detection output 404-N into an adapted representation 702-N.

At 908, example method 900 may include providing the adapted representation in a shared prediction output space with the predicted distribution from the second object detection output. For example, adapted representation 702-N may be a distribution over candidate classes and adapted representation 702-1 may be a distribution over candidate classes. The shared prediction output space may be a space of distribution values over candidate classes. In this manner, for instance, logit values from the adapted representations may be combined using output layer(s) 604.

At 910, example method 900 may include generating, by the prediction resolution model, a resolved object detection output based on the adapted representation and the predicted distribution, wherein the resolved object detection output indicates a second predicted class for the object. For example, resolved object detection output 420 may include a predicted class for the object. The predicted class may be the same as or different from the class predicted by object detection pipeline 404-N.

In some implementations, example method 900 includes querying a data structure including one or more precomputed logit estimation tensors using the first predicted class. In some implementations, example method 900 includes retrieving (e.g., responsive to the querying) a precomputed logit tensor associated with the first predicted class and the first object detection model, wherein the precomputed logit tensor indicates an estimated distribution over candidate classes. For example, adapted representation 702-N may represent scores or logit values for each of a plurality of the candidate classes. These logit values may be estimates of expected values of logits of a model in output pipeline 402-N. Data structure 802 may store adapted representation 702-N, or a tensor of estimation values on which adapted representation 702-N is based.

In some implementations, example method 900 includes transforming, using a calibration model configured to adapt outputs from the first object detection model into the shared prediction output space, the portion of the first object detection output into the adapted representation of the first object detection output. For example, calibration model 602-N may adapt output 404-N into a distribution format that is a member of the space of distributions. For example, for distributions in $R^7$ (e.g., a vector containing 7 real-numbered elements), calibration model 602-N may adapt output 404-N into an adapted representation in $R^7$.

In some implementations of example method 900, the first object detection output includes first update data for an object track stored by the perception system to track an object in the environment, wherein the first update data indicates a first update to the object track. For example, as described with respect to FIG. 5, object detection pipeline 402-N may output object detection output 404-N to object tracker 430 to initialize or update object track 506. In some implementations of example method 900, the second object detection output includes second update data for the object track, wherein the second update data indicates a second update to the object track. For example, as described with respect to FIG. 5, object detection pipeline 402-1 may output object detection output 404-1 to object tracker 430 to initialize or update object track 506.

In some implementations of example method 900, the first portion of sensor data includes a modality of data not present in the second portion of sensor data. For example, object detection pipeline 402-1 may process different modalities of data from object detection pipeline 402-N.

In some implementations of example method 900, the first portion of sensor data includes data describing a different field of view of the environment as compared to the second portion of sensor data. For example, object detection pipeline 402-1 may process sensor data having a different field of view from sensor data processed by object detection pipeline 402-N.

In some implementations of example method 900, the prediction resolution model executes periodically to resolve conflicts between object detection outputs from the first object detection model and the second object detection model. For example, prediction resolution model may be triggered upon, for example, receipt of a trigger 508, population of a queue, elapsed time since last execution, or completion of a regularly-occurring prerequisite process (e.g., an upstream operation in a cycle of operations). Prediction resolution model 410 may be triggered based on a detected disagreement among object detection pipelines 402-1, . . . , 402-N.

In some implementations of example method 900, the first object detection model generates the first object detection output at a first time, and wherein the second object detection model generates the second object detection output at a second time. For example, the first time may be before the second time. The first time may be after the second time.

In some implementations of example method 900, one or more output layers of the prediction resolution model discount a contribution of the first object detection model based on the first time. For example, an age parameter may decrease a contribution of the first object detection model relative to a contribution of the second object detection model based on the first time preceding the second time. In some implementations of example method 900, one or more output layers of the prediction resolution model discount a contribution of the second object detection model based on the second time. For example, an age parameter may decrease a contribution of the second object detection model relative to a contribution of the first object detection model based on the second time preceding the first time. For example, an initial weight value may decay as a function of increasing age.

In some implementations of example method 900, one or more output layers of the prediction resolution model are optimized using a global optimizer over a single batch of ground truth examples. For example, an output layer (e.g., output layer(s) 604) may include one or more learnable parameters that may be optimized over a batch of training examples. In some implementations of example method 900, one or more output layers of the prediction resolution model are optimized using a non-uniformly downsampled batch of a dataset of ground truth examples, wherein a ratio of a number of a respective category of examples in the batch to a number of the respective category in the dataset is inversely correlated with an error rate associated with the respective category.

In some implementations of example method 900, the one or more output layers are linear with respect to the first object detection output and the adjusted representation. For example, the one or more output layers may implement a linear combination of logit values represented by the first object detection output and the adjust representation. In some implementations of example method 900, the one or more output layers are linear with respect to an adjusted representation of the first object detection output and the adjusted representation of the second object detection output. For example, the one or more output layers may implement a linear combination of logit values represented by the adjusted representation of the first object detection output and the adjusted representation of the second object detection output.

In some implementations, example method 900 includes transforming, by a calibration model configured to adapt outputs from the second object detection model, the predicted distribution into a second adapted representation. For instance, calibration model 602-1 may reshape or otherwise adjust a distribution output by object detection pipeline 402-1. In some implementations of example method 900, the resolved object detection output is based on a linear combination of the adapted representation and the second adapted representation.

FIG. 10 is a flowchart of an example method 1000 according to aspects of the present disclosure. One or more portions of example method 1000 may be implemented by the computing systems described with reference to the other figures (e.g., autonomous platform 110, vehicle computing system 180, remote system 160, a system of FIGS. 1 to 13). Each respective portion of example method 1000 may be performed by any (or any combination) of one or more computing devices. Moreover, one or more portions of example method 1000 may be implemented on the hardware components of the devices described herein (e.g., as in FIGS. 1 to 13).

FIG. 10 depicts elements performed in a particular order for purposes of illustration and discussion. Those of ordinary skill in the art, using the disclosures provided herein, will understand that the elements of any of the methods discussed herein may be adapted, rearranged, expanded, omitted, combined, or modified in various ways without deviating from the scope of the present disclosure. FIG. 10 is described with reference to elements/terms described with respect to other systems and figures for exemplary illustrated purposes and is not meant to be limiting. One or more portions of example method 1000 may be performed additionally, or alternatively, by other systems.

At 1002, example method 1000 may include generating, at a first time, by a first object detection model of a perception system of an autonomous vehicle and based on a first portion of sensor data describing a first portion of an environment of the autonomous vehicle, a first object detection output. For example, as described with respect to FIG. 5, object detection pipeline 402-1 may output object detection output 404-1.

At 1004, example method 1000 may include generating, at a second time, by a second object detection model of the perception system and based on a second portion of sensor data describing a second portion of the environment, a second object detection output. For example, as described with respect to FIG. 5, object detection pipeline 402-N may output object detection output 404-N. Object detection pipeline 402-N may output object detection output 404-N after object detection pipeline 402-1 outputs object detection output 404-1.

At 1006, example method 1000 may include generating, by a prediction resolution model and based on the first object detection output and the second object detection output in a shared prediction output space, a resolved object detection output, wherein the prediction resolution model executes periodically to resolve conflicts between object detection outputs from the first object detection model and the second object detection model. For example, prediction resolution model may be triggered upon, for example, population of a queue, elapsed time since last execution, or completion of a regularly-occurring prerequisite process (e.g., an upstream operation in a cycle of operations). Prediction resolution model 410 may be triggered based on a detected disagreement among object detection pipelines 402-1, . . . , 402-N.

In some implementations of example method 1000, the first object detection output includes first update data for an object track stored by the perception system to track an object in the environment, wherein the first update data indicates a first update to the object track. For example, as described with respect to FIG. 5, object detection pipeline 402-1 may output object detection output 404-1 to object tracker 430 to initialize or update object track 506. In some implementations of example method 1000, the second object detection output includes second update data for the object track, wherein the second update data indicates a second update to the object track. For example, as described with respect to FIG. 5, object detection pipeline 402-N may output object detection output 404-N to object tracker 430 to initialize or update object track 506.

In some implementations of example method 1000, the first portion of sensor data includes a modality of data not present in the second portion of sensor data.

In some implementations of example method 1000, the first portion of sensor data includes data describing a different field of view of the environment as compared to the second portion of sensor data.

In some implementations of example method 1000, the prediction resolution model discounts a contribution of the first object detection model based on the first time.

In some implementations, example method 1000 includes adapting, by the prediction resolution model, at least a portion of the first object detection output to obtain a representation of the first object detection output in the shared prediction output space. In some implementations, example method 1000 includes generating the resolved object detection output based on the representation of the first object detection output in the shared prediction output space.

In some implementations, example method 1000 includes processing, by the prediction resolution model, a predicted class from the first object detection output. In some implementations, example method 1000 includes processing, by the prediction resolution model, a predicted distribution over candidate classes from the second object detection output. In some implementations, example method 1000 includes adapting, by the prediction resolution model, at least a portion of the first object detection output into an adapted representation of the first object detection output. In some implementations, example method 1000 includes providing the adapted representation in a shared prediction output space with the predicted distribution from the second object detection output. In some implementations, example method 1000 includes generating, using the prediction resolution model, a resolved object detection output based on the adapted representation and the predicted distribution.

FIG. 11 is a flowchart of an example method 1100 according to aspects of the present disclosure. One or more portions of example method 1100 may be implemented by the computing systems described with reference to the other figures (e.g., autonomous platform 110, vehicle computing system 180, remote system 160, a system of FIGS. 1 to 13). Each respective portion of example method 1100 may be performed by any (or any combination) of one or more computing devices. Moreover, one or more portions of example method 1100 may be implemented on the hardware components of the devices described herein (e.g., as in FIGS. 1 to 13).

FIG. 11 depicts elements performed in a particular order for purposes of illustration and discussion. Those of ordinary skill in the art, using the disclosures provided herein, will understand that the elements of any of the methods discussed herein may be adapted, rearranged, expanded, omitted, combined, or modified in various ways without deviating from the scope of the present disclosure. FIG. 11 is described with reference to elements/terms described with respect to other systems and figures for exemplary illustrated purposes and is not meant to be limiting. One or more portions of example method 1100 may be performed additionally, or alternatively, by other systems.

At 1102, example method 1100 may include generating, by a first object detection model of a perception system of an autonomous vehicle and based on a first portion of sensor data describing a first portion of an environment of the autonomous vehicle, a first object detection output that includes first update data for an object track stored by the perception system to track an object in the environment, wherein the first update data indicates a first update to the object track. For example, as described with respect to FIG. 5, object detection pipeline 402-1 may output object detection output 404-1 to object tracker 430 to initialize or update object track 506.

At 1104, example method 1100 may include generating, by a second object detection model of the perception system and based on a second portion of sensor data describing a second portion of the environment, a second object detection output that includes second update data for the object track, wherein the second update data indicates a second update to the object track. For example, as described with respect to FIG. 5, object detection pipeline 402-N may output object detection output 404-N to object tracker 430 to initialize or update object track 506.

At 1106, example method 1100 may include generating, by a prediction resolution model and based on the first update data and the second update data in a shared prediction output space, a resolved object detection output that includes a resolved update for the object track. For example, as described with respect to FIG. 5, prediction resolution model 410 may output resolved object detection output 420 to object tracker 430 to update object track 506 with a resolved prediction.

In some implementations of example method 1100, the prediction resolution model executes periodically to resolve conflicts between object detection outputs from the first object detection model and the second object detection model. For example, prediction resolution model may be triggered upon, for example, receipt of a trigger 508, population of a queue, elapsed time since last execution, or completion of a regularly-occurring prerequisite process (e.g., an upstream operation in a cycle of operations). Prediction resolution model 410 may be triggered based on a detected disagreement among object detection pipelines 402-1, . . . , 402-N.

In some implementations of example method 1100, the first portion of sensor data includes data describing a different field of view of the environment as compared to the second portion of sensor data.

Figure 12:
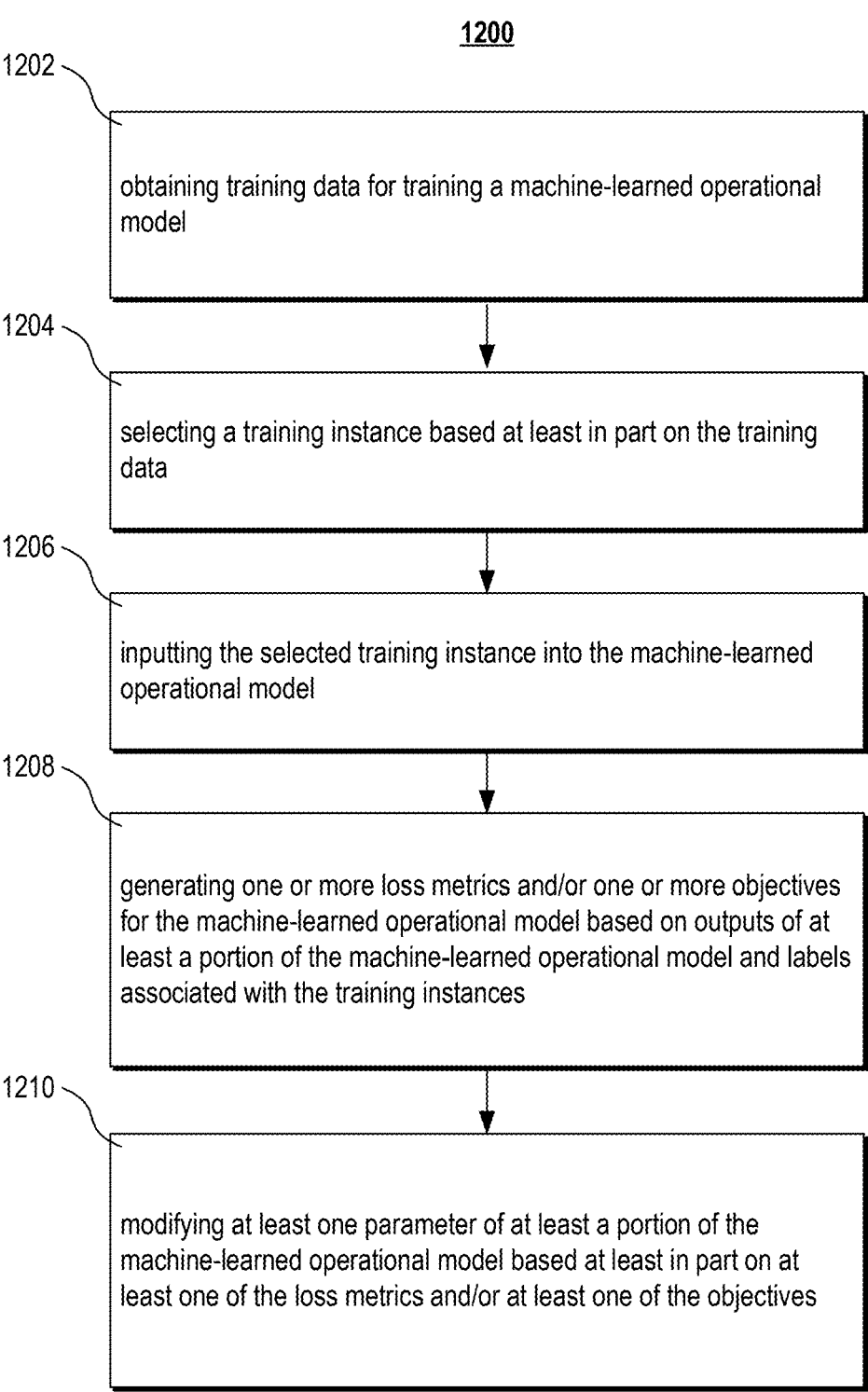
FIG. 12 is a flowchart of an example method for training a machine-learned operational system, according to some implementations of the present disclosure.

FIG. 12 is a flowchart of an example method 1200 for training one or more machine-learned operational models, according to aspects of the present disclosure. For instance, an operational system may include a machine-learned operational model. For example, one or more of localization system 230, perception system 240, planning system 250, control system 260, object detection pipeline(s) 402-1, . . . , 402-N, prediction resolution model 410, object tracker 430, calibration model 602-1, . . . , 602-N, output layer(s) 604, etc. may include a machine-learned operational model that may be trained according to example method 1200.

One or more portions of example method 1200 may be implemented by a computing system that includes one or more computing devices such as, for example, the computing systems described with reference to the other figures (e.g., autonomous platform 110, vehicle computing system 180, remote system 160, a system of FIGS. 1 to 12). Each respective portion of example method 1200 may be performed by any (or any combination) of one or more computing devices. Moreover, one or more portions of example method 1200 may be implemented on the hardware components of the devices described herein (e.g., as in FIGS. 1 to 13), for example, to train or validate one or more systems or models.

FIG. 12 depicts elements performed in a particular order for purposes of illustration and discussion. Those of ordinary skill in the art, using the disclosures provided herein, will understand that the elements of any of the methods discussed herein may be adapted, rearranged, expanded, omitted, combined, or modified in various ways without deviating from the scope of the present disclosure. FIG. 12 is described with reference to elements/terms described with respect to other systems and figures for exemplary illustrated purposes and is not meant to be limiting. One or more portions of example method 1200 may be performed additionally, or alternatively, by other systems.

At 1202, example method 1200 may include obtaining training data for training a machine-learned operational model. The training data may include a plurality of training instances.

The training data may be collected using one or more autonomous platform 110s (e.g., autonomous platform 110) or the sensors thereof as autonomous platform 110 is within its environment. By way of example, the training data may be collected using one or more autonomous vehicles (e.g., autonomous platform 110, autonomous vehicle 110, autonomous vehicle 350) or sensors thereof as the vehicle operates along one or more travel ways. In some examples, the training data may be collected using other sensors, such as mobile-device-based sensors, ground-based sensors, aerial-based sensors, satellite-based sensors, or substantially any sensor interface configured for obtaining and/or recording measured data.

The training data may include a plurality of training sequences divided between multiple datasets (e.g., a training dataset, a validation dataset, or testing dataset). Each training sequence may include a plurality of pre-recorded perception datapoints, point clouds, images In some implementations, each sequence may include LIDAR point clouds (e.g., collected using LIDAR sensors of an autonomous platform 110), images (e.g., collected using mono or stereo imaging sensors), and the like. For instance, in some implementations, a plurality of images may be scaled for training and evaluation.

At 1204, example method 1200 may include selecting a training instance based at least in part on the training data.

At 1206, example method 1200 may include inputting the training instance into the machine-learned operational model.

At 1208, example method 1200 may include generating one or more loss metrics and/or one or more objectives for the machine-learned operational model based on outputs of at least a portion of the machine-learned operational model and labels associated with the training instances.

At 1210, example method 1200 may include modifying at least one parameter of at least a portion of the machine-learned operational model based at least in part on at least one of the loss metrics and/or at least one of the objectives. For example, a computing system may modify at least a portion of the machine-learned operational model based at least in part on at least one of the loss metrics and/or at least one of the objectives.

In some implementations, the machine-learned operational model may be trained in an end-to-end manner. For example, in some implementations, the machine-learned operational model may be partially or fully differentiable. For example, a loss may be backpropagated through at least a portion of an example machine-learned operational model to compute a gradient with respect to the loss at a particular parameter location, and the parameter value may be updated based on the gradient. Portions of an example machine-learned operational model may be non-differentiable, so gradient-free or gradient-estimation techniques may be used for updating learnable or otherwise optimizable parameter values.

After being updated, the operational model or the operational system including the operational model may be provided for validation. In some implementations, a validation system may evaluate or validate the operational system. The validation system may trigger retraining, decommissioning of the operational system based on, for example, failure to satisfy a validation threshold in one or more areas.

Figure 13:
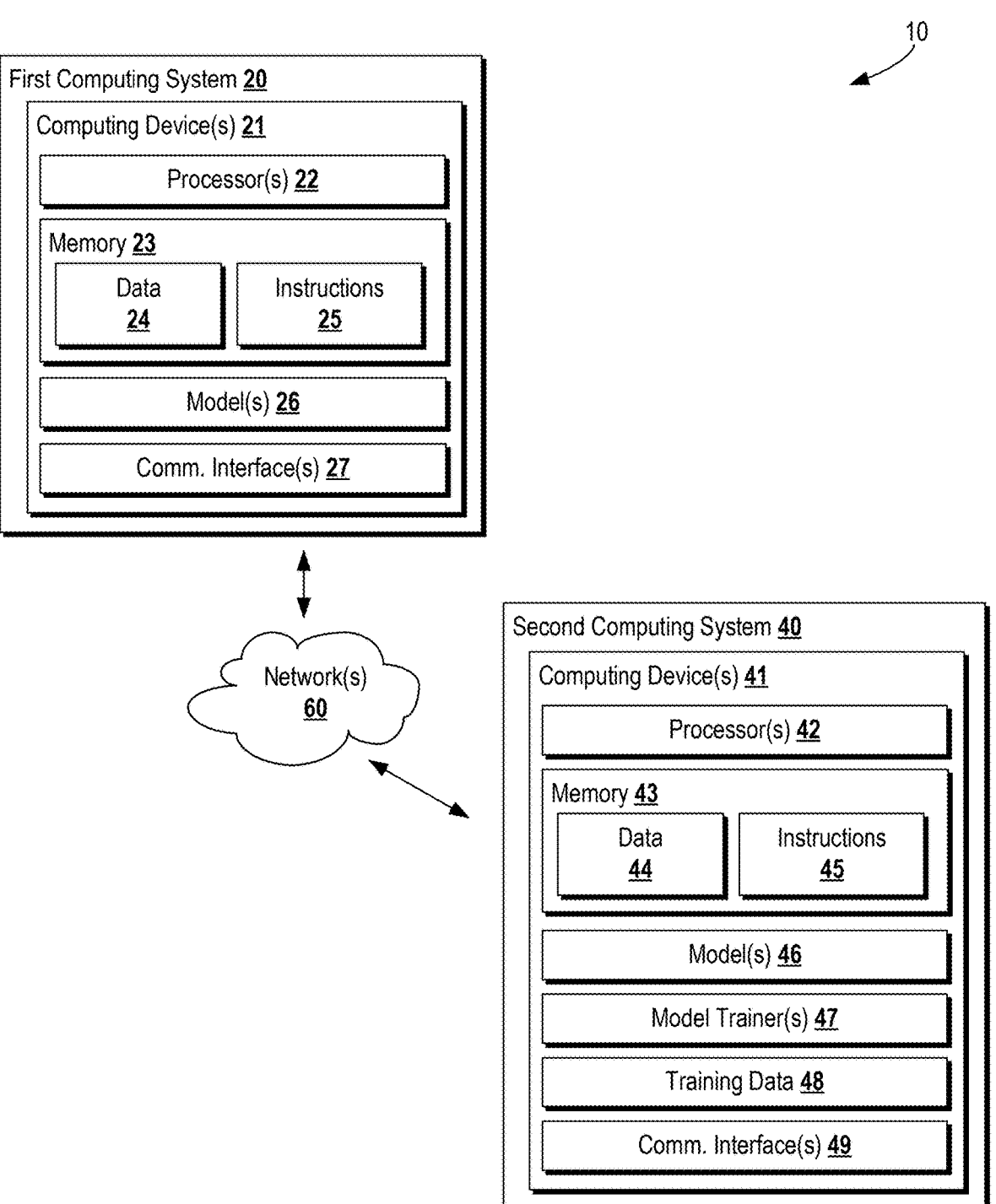
FIG. 13 is a block diagram of an example computing system, according to some implementations of the present disclosure.

FIG. 13 is a block diagram of an example computing ecosystem 10 according to example implementations of the present disclosure. The example computing ecosystem 10 may include a first computing system 20 and a second computing system 40 that are communicatively coupled over one or more networks 60. In some implementations, the first computing system 20 or the second computing 40 may implement one or more of the systems, operations, or functionalities described herein for validating one or more systems or operational systems (e.g., the remote system 160, the onboard computing system 180, the autonomy system 200).

In some implementations, the first computing system 20 may be included in an autonomous platform 110 and be utilized to perform the functions of an autonomous platform 110 as described herein. For example, the first computing system 20 may be located onboard an autonomous vehicle and implement autonomy system for autonomously operating the autonomous vehicle. In some implementations, the first computing system 20 may represent the entire onboard computing system or a portion thereof (e.g., the localization system 230, the perception system 240, the planning system 250, the control system 260, or a combination thereof). In other implementations, the first computing system 20 may not be located onboard an autonomous platform 110. The first computing system 20 may include one or more distinct physical computing devices 21.

The first computing system 20 (e.g., the computing devices 21 thereof) may include one or more processors 22 and a memory 23. The one or more processors 22 may be any suitable processing device (e.g., a processor core, a microprocessor, an ASIC, a FPGA, a controller, a microcontroller) and may be one processor or a plurality of processors that are operatively connected. Memory 23 may include one or more non-transitory computer-readable storage media, such as RAM, ROM, EEPROM, EPROM, one or more memory devices, flash memory devices, and combinations thereof.

Memory 23 may store information that may be accessed by the one or more processors 22. For instance, the memory 23 (e.g., one or more non-transitory computer-readable storage media, memory devices) may store data 24 that may be obtained (e.g., received, accessed, written, manipulated, created, generated, stored, pulled, downloaded). The data 24 may include, for instance, sensor data, map data, data associated with autonomy functions (e.g., data associated with the perception, planning, or control functions), simulation data, or any data or information described herein. In some implementations, the first computing system 20 may obtain data from one or more memory devices that are remote from the first computing system 20.

Memory 23 may store computer-readable instructions 25 that may be executed by the one or more processors 22. Instructions 25 may be software written in any suitable programming language or may be implemented in hardware. Additionally, or alternatively, instructions 25 may be executed in logically or virtually separate threads on the processors 22.

For example, the memory 23 may store instructions 25 that are executable by one or more processors (e.g., by the one or more processors 22, by one or more other processors) to perform (e.g., with the computing devices 21, the first computing system 20, or other systems having processors executing the instructions) any of the operations, functions, or methods/processes (or portions thereof) described herein. For example, operations may include implementing system validation.

In some implementations, the first computing system 20 may store or include one or more models 26. In some implementations, the models 26 may be or may otherwise include one or more machine-learned models (e.g., a machine-learned operational system). As examples, the models 26 may be or may otherwise include various machine-learned models such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks. For example, the first computing system 20 may include one or more models for implementing subsystems of the autonomy system 200, including any of: the localization system 230, the perception system 240, the planning system 250, or the control system 260.

In some implementations, the first computing system 20 may obtain the one or more models 26 using communication interface 27 to communicate with the second computing system 40 over the network 60. For instance, the first computing system 20 may store the models 26 (e.g., one or more machine-learned models) in memory 23. The first computing system 20 may then use or otherwise implement the models 26 (e.g., by the processors 22). By way of example, the first computing system 20 may implement the models 26 to localize an autonomous platform 110 in an environment, perceive an environment of an autonomous platform 110 or objects therein, plan one or more future states of an autonomous platform 110 for moving through an environment, control an autonomous platform 110 for interacting with an environment The second computing system 40 may include one or more computing devices 41. The second computing system 40 may include one or more processors 42 and a memory 43. The one or more processors 42 may be any suitable processing device (e.g., a processor core, a microprocessor, an ASIC, a FPGA, a controller, a microcontroller) and may be one processor or a plurality of processors that are operatively connected. The memory 43 may include one or more non-transitory computer-readable storage media, such as RAM, ROM, EEPROM, EPROM, one or more memory devices, flash memory devices, and combinations thereof.

Memory 43 may store information that may be accessed by the one or more processors 42. For instance, the memory 43 (e.g., one or more non-transitory computer-readable storage media, memory devices) may store data 44 that may be obtained. The data 44 may include, for instance, sensor data, model parameters, map data, simulation data, simulated environmental scenes, simulated sensor data, data associated with vehicle trips/services, or any data or information described herein. In some implementations, the second computing system 40 may obtain data from one or more memory devices that are remote from the second computing system 40.

Memory 43 may also store computer-readable instructions 45 that may be executed by the one or more processors 42. The instructions 45 may be software written in any suitable programming language or may be implemented in hardware. Additionally, or alternatively, the instructions 45 may be executed in logically or virtually separate threads on the processors 42.

For example, memory 43 may store instructions 45 that are executable (e.g., by the one or more processors 42, by the one or more processors 22, by one or more other processors) to perform (e.g., with the computing devices 41, the second computing system 40, or other systems having processors for executing the instructions, such as computing devices 21 or the first computing system 20) any of the operations, functions, or methods/processes described herein. This may include, for example, the functionality of the autonomy system 200 (e.g., localization, perception, planning, control) or other functionality associated with an autonomous platform 110 (e.g., remote assistance, mapping, fleet management, trip/service assignment and matching). This may also include, for example, validating a machined-learned operational system.

In some implementations, second computing system 40 may include one or more server computing devices. In the event that the second computing system 40 includes multiple server computing devices, such server computing devices may operate according to various computing architectures, including, for example, sequential computing architectures, parallel computing architectures, or some combination thereof.

Additionally, or alternatively to, the models 26 at the first computing system 20, the second computing system 40 may include one or more models 46. As examples, the models 46 may be or may otherwise include various machine-learned models (e.g., a machine-learned operational system) such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks. For example, the second computing system 40 may include one or more models of the autonomy system 200.

In some implementations, the second computing system 40 or the first computing system 20 may train one or more machine-learned models of the models 26 or the models 46 through the use of one or more model trainers 47 and training data 48. The model trainer 47 may train any one of the models 26 or the models 46 using one or more training or learning algorithms. One example training technique is backwards propagation of errors. In some implementations, the model trainer 47 may perform supervised training techniques using labeled training data. In other implementations, the model trainer 47 may perform unsupervised training techniques using unlabeled training data. In some implementations, the training data 48 may include simulated training data (e.g., training data obtained from simulated scenarios, inputs, configurations, environments). In some implementations, the second computing system 40 may implement simulations for obtaining the training data 48 or for implementing the model trainer 47 for training or testing the models 26 or the models 46. By way of example, the model trainer 47 may train one or more components of a machine-learned model for the autonomy system 200 through unsupervised training techniques using an objective function (e.g., costs, rewards, metrics, constraints). In some implementations, the model trainer 47 may perform a number of generalization techniques to improve the generalization capability of the models being trained. Generalization techniques include weight decays, dropouts, or other techniques.

For example, in some implementations, the second computing system 40 may generate training data 48 according to example aspects of the present disclosure. For instance, the second computing system 40 may generate training data 48. For instance, the second computing system 40 may implement methods according to example aspects of the present disclosure. The second computing system 40 may use the training data 48 to train models 26. For example, in some implementations, the first computing system 20 may include a computing system onboard or otherwise associated with a real or simulated autonomous vehicle. In some implementations, models 26 may include perception or machine vision models configured for deployment onboard or in service of a real or simulated autonomous vehicle. In this manner, for instance, the second computing system 40 may provide a training pipeline for training models 26.

The first computing system 20 and the second computing system 40 may each include communication interfaces 27 and 49, respectively. The communication interfaces 27, 49 may be used to communicate with each other or one or more other systems or devices, including systems or devices that are remotely located from the first computing system 20 or the second computing system 40. The communication interfaces 27, 49 may include any circuits, components, software for communicating with one or more networks (e.g., the network 60). In some implementations, the communication interfaces 27, 49 may include, for example, one or more of a communications controller, receiver, transceiver, transmitter, port, conductors, software or hardware for communicating data.

The network 60 may be any type of network or combination of networks that allows for communication between devices. In some implementations, the network may include one or more of a local area network, wide area network, the Internet, secure network, cellular network, mesh network, peer-to-peer communication link or some combination thereof and may include any number of wired or wireless links. Communication over the network 60 may be accomplished, for instance, through a network interface using any type of protocol, protection scheme, encoding, format, packaging FIG. 13 illustrates one example computing ecosystem 10 that may be used to implement the present disclosure. For example, one or more systems or devices of ecosystem 10 may implement any one or more of the systems and components described in the preceding figures. Other systems may be used as well. For example, in some implementations, the first computing system 20 may include the model trainer 47 and the training data 48. In such implementations, the models 26, 46 may be both trained and used locally at the first computing system 20. As another example, in some implementations, the computing system 20 may not be connected to other computing systems. Additionally, components illustrated or discussed as being included in one of the computing systems 20 or 40 may instead be included in another one of the computing systems 20 or 40.

Computing tasks discussed herein as being performed at computing devices remote from autonomous platform 110 (e.g., autonomous vehicle) may instead be performed at autonomous platform 110 (e.g., via a vehicle computing system of the autonomous vehicle), or vice versa. Such configurations may be implemented without deviating from the scope of the present disclosure. The use of computer-based systems allows for a great variety of possible configurations, combinations, and divisions of tasks and functionality between and among components. Computer-implemented operations may be performed on a single component or across multiple components. Computer-implemented tasks or operations may be performed sequentially or in parallel. Data and instructions may be stored in a single memory device or across multiple memory devices.

Aspects of the disclosure have been described in terms of illustrative implementations thereof. Numerous other implementations, modifications, or variations within the scope and spirit of the appended claims may occur to persons of ordinary skill in the art from a review of this disclosure. Any and all features in the following claims may be combined or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Lists joined by a particular conjunction such as "or," for example, may refer to "at least one of" or "any combination of" example elements listed therein, with "or" being understood as "and/or" unless otherwise indicated. Also, terms such as "based on" should be understood as "based at least in part on."

Those of ordinary skill in the art, using the disclosures provided herein, will understand that the elements of any of the claims, operations, or processes discussed herein may be adapted, rearranged, expanded, omitted, combined, or modified in various ways without deviating from the scope of the present disclosure. Some of the claims are described with a letter reference to a claim element for exemplary illustrated purposes and is not meant to be limiting. The letter references do not imply a particular order of operations. For instance, letter identifiers such as (a), (b), (c), . . . , (i), (ii), (iii), . . . may be used to illustrate operations. Such identifiers are provided for the case of the reader and do not denote a particular order of steps or operations. An operation illustrated by a list identifier of (a), (i) may be performed before, after, or in parallel with another operation illustrated by a list identifier of (b), (ii)

The term "can" should be understood as referring to a possibility of a feature in various implementations and not as prescribing an ability that is necessarily present in every implementation. For example, the phrase "X may perform Y" should be understood as indicating that, in various implementations, X has the potential to be configured to perform Y, and not as indicating that in every instance X must always be able to perform Y. It should be understood that, in various implementations, X might be unable to perform Y and remain within the scope of the present disclosure.

The term "may" should be understood as referring to a possibility of a feature in various implementations and not as prescribing an ability that is necessarily present in every implementation. For example, the phrase "X may perform Y" should be understood as indicating that, in various implementations, X has the potential to be configured to perform Y, and not as indicating that in every instance X must always be able to perform Y. It should be understood that, in various implementations, X might be unable to perform Y and remain within the scope of the present disclosure.

What is claimed is:

1. A computer-implemented method, comprising:

generating, by a first object detection model of a perception system of an autonomous vehicle and based on a first portion of sensor data describing a first portion of an environment of the autonomous vehicle, a first object detection output that comprises a first predicted class for an object;

generating, by a second object detection model of the perception system and based on a second portion of sensor data describing a second portion of the environment, a second object detection output that comprises a predicted distribution over candidate classes for the object;

querying a data structure comprising one or more precomputed logit estimation tensors using the first predicted class;

retrieving a precomputed logit tensor associated with the first predicted class and the first object detection model, wherein the precomputed logit tensor indicates an estimated distribution over candidate classes;

adapting, by a prediction resolution model, at least a portion of the first object detection output into an adapted representation of the first object detection output;

providing the adapted representation in a shared prediction output space with the predicted distribution from the second object detection output; and generating, by the prediction resolution model, a resolved object detection output based on the adapted representation and the predicted distribution, wherein the resolved object detection output indicates a second predicted class for the object.

2. A computer-implemented method, comprising:

generating, by a first object detection model of a perception system of an autonomous vehicle and based on a first portion of sensor data describing a first portion of an environment of the autonomous vehicle, a first object detection output that comprises a first predicted class for an object;

generating, by a second object detection model of the perception system and based on a second portion of sensor data describing a second portion of the environment, a second object detection output that comprises a predicted distribution over candidate classes for the object;

adapting by a prediction resolution model, at least a portion of the first object detection output into an adapted representation of the first object detection output, wherein one or more output layers of the prediction resolution model are optimized using a global optimizer over a single batch of ground truth examples;

providing the adapted representation in a shared prediction output space with the predicted distribution from the second object detection output; and generating, by the prediction resolution model, a resolved object detection output based on the adapted representation and the predicted distribution, wherein the resolved object detection output indicates a second predicted class for the object.

3. A computer-implemented method, comprising:

generating, by a first object detection model of a perception system of an autonomous vehicle and based on a first portion of sensor data describing a first portion of an environment of the autonomous vehicle, a first object detection output that comprises a first predicted class for an object;

generating, by a second object detection model of the perception system and based on a second portion of sensor data describing a second portion of the environment, a second object detection output that comprises a predicted distribution over candidate classes for the object;

adapting, by a prediction resolution model, at least a portion of the first object detection output into an adapted representation of the first object detection output, wherein one or more output layers of the prediction resolution model are optimized using a non-uniformly downsampled batch of a dataset of ground truth examples, wherein a ratio of a number of a respective category of examples in the batch to a number of the respective category in the dataset is inversely correlated with an error rate associated with the respective category;

providing the adapted representation in a shared prediction output space with the predicted distribution from the second object detection output; and generating, by the prediction resolution model, a resolved object detection output based on the adapted representation and the predicted distribution, wherein the resolved object detection output indicates a second predicted class for the object.

4. A computer-implemented method, comprising:

generating, at a first time, by a first object detection model of a perception system of an autonomous vehicle and based on a first portion of sensor data describing a first portion of an environment of the autonomous vehicle, a first object detection output;

generating, at a second time, by a second object detection model of the perception system and based on a second portion of sensor data describing a second portion of the environment, a second object detection output; and generating, by a prediction resolution model and based on the first object detection output and the second object detection output in a shared prediction output space, a resolved object detection output, wherein the prediction resolution model executes periodically to resolve conflicts between object detection outputs from the first object detection model and the second object detection model, the prediction resolution model discounting a contribution of the first object detection model based on the first time or discounting a contribution of the second object detection model based on the second time.

5. The computer-implemented method of claim 4, wherein:

the first object detection output comprises first update data for an object track stored by the perception system to track an object in the environment, wherein the first update data indicates a first update to the object track; and the second object detection output comprises second update data for the object track, wherein the second update data indicates a second update to the object track.

6. The computer-implemented method of claim 4, wherein the first portion of sensor data comprises a modality of data not present in the second portion of sensor data.

7. The computer-implemented method of claim 4, wherein the first portion of sensor data comprises data describing a different field of view of the environment as compared to the second portion of sensor data.

8. A computer-implemented method, comprising:

generating, at a first time, by a first object detection model of a perception system of an autonomous vehicle and based on a first portion of sensor data describing a first portion of an environment of the autonomous vehicle, a first object detection output;

generating, at a second time, by a second object detection model of the perception system and based on a second portion of sensor data describing a second portion of the environment, a second object detection output;

generating, by a prediction resolution model and based on the first object detection output and the second object detection output in a shared prediction output space, a resolved object detection output, wherein the prediction resolution model executes periodically to resolve conflicts between object detection outputs from the first object detection model and the second object detection model;

adapting, by the prediction resolution model, at least a portion of the first object detection output to obtain a representation of the first object detection output in the shared prediction output space; and generating the resolved object detection output based on the representation of the first object detection output in the shared prediction output space.

9. A computer-implemented method, comprising:

generating, at a first time, by a first object detection model of a perception system of an autonomous vehicle and based on a first portion of sensor data describing a first portion of an environment of the autonomous vehicle, a first object detection output;

generating, at a second time, by a second object detection model of the perception system and based on a second portion of sensor data describing a second portion of the environment, a second object detection output;

generating, by a prediction resolution model and based on the first object detection output and the second object detection output in a shared prediction output space, a resolved object detection output, wherein the prediction resolution model executes periodically to resolve conflicts between object detection outputs from the first object detection model and the second object detection model;

processing, by the prediction resolution model, a predicted class from the first object detection output;

processing, by the prediction resolution model, a predicted distribution over candidate classes from the second object detection output;

adapting, by the prediction resolution model, at least a portion of the first object detection output into an adapted representation of the first object detection output;

providing the adapted representation in a shared prediction output space with the predicted distribution from the second object detection output; and generating, by the prediction resolution model, the resolved object detection output based on the adapted representation and the predicted distribution.

10. The computer-implemented method of claim 4, wherein one or more output layers of the prediction resolution model are optimized using a global optimizer over a single batch of ground truth examples.

11. The computer-implemented method of claim 4, wherein one or more output layers of the prediction resolution model are optimized using a non-uniformly downsampled batch of a dataset of ground truth examples, wherein a ratio of a number of a respective category of examples in the batch to a number of the respective category in the dataset is inversely correlated with an error rate associated with the respective category.

12. A computing system comprising:

one or more processors; and one or more non-transitory computer-readable media storing instructions that are executable by the one or more processors to cause the computing system to perform operations comprising:

generating, at a first time, by a first object detection model of a perception system of an autonomous vehicle and based on a first portion of sensor data describing a first portion of an environment of the autonomous vehicle, a first object detection output;

generating, at a second time, by a second object detection model of the perception system and based on a second portion of sensor data describing a second portion of the environment, a second object detection output; and generating, by a prediction resolution model and based on the first object detection output and the second object detection output in a shared prediction output space, a resolved object detection output, wherein the prediction resolution model executes periodically to resolve conflicts between object detection outputs from the first object detection model and the second object detection model, the prediction resolution model discounting a contribution of the first object detection model based on the first time or discounting a contribution of the second object detection model based on the second time.

13. The computing system of claim 12, wherein:

the first object detection output comprises first update data for an object track stored by the perception system to track an object in the environment, wherein the first update data indicates a first update to the object track; and the second object detection output comprises second update data for the object track, wherein the second update data indicates a second update to the object track.

14. The computing system of claim 12, wherein the first portion of sensor data comprises a modality of data not present in the second portion of sensor data.

15. The computing system of claim 12, wherein the first portion of sensor data comprises data describing a different field of view of the environment as compared to the second portion of sensor data.

16. The computing system of claim 12, the operations comprising:

adapting, by the prediction resolution model, at least a portion of the first object detection output to obtain a representation of the first object detection output in the shared prediction output space; and generating the resolved object detection output based on the representation of the first object detection output in the shared prediction output space.

17. The computing system of claim 12, the operations comprising:

processing, by the prediction resolution model, a predicted class from the first object detection output;

processing, by the prediction resolution model, a predicted distribution over candidate classes from the second object detection output;

adapting, by the prediction resolution model, at least a portion of the first object detection output into an adapted representation of the first object detection output;

providing the adapted representation in a shared prediction output space with the predicted distribution from the second object detection output; and generating, by the prediction resolution model, the resolved object detection output based on the adapted representation and the predicted distribution.

18. The computing system of claim 12, wherein one or more output layers of the prediction resolution model are optimized using a global optimizer over a single batch of ground truth examples.

19. The computing system of claim 12, wherein one or more output layers of the prediction resolution model are optimized using a non-uniformly downsampled batch of a dataset of ground truth examples, wherein a ratio of a number of a respective category of examples in the batch to a number of the respective category in the dataset is inversely correlated with an error rate associated with the respective category.

20. One or more non-transitory computer-readable media storing instructions that are executable by one or more processors to cause a computing system to perform operations comprising:

generating, at a first time, by a first object detection model of a perception system of an autonomous vehicle and based on a first portion of sensor data describing a first portion of an environment of the autonomous vehicle, a first object detection output;

generating, at a second time, by a second object detection model of the perception system and based on a second portion of sensor data describing a second portion of the environment, a second object detection output; and generating, by a prediction resolution model and based on the first object detection output and the second object detection output in a shared prediction output space, a resolved object detection output, wherein the prediction resolution model executes periodically to resolve conflicts between object detection outputs from the first object detection model and the second object detection model, the prediction resolution model discounting a contribution of the first object detection model based on the first time or discounting a contribution of the second object detection model based on the second time.

21. The one or more non-transitory computer-readable media of claim 20, wherein:

the first object detection output comprises first update data for an object track stored by the perception system to track an object in the environment, wherein the first update data indicates a first update to the object track; and the second object detection output comprises second update data for the object track, wherein the second update data indicates a second update to the object track.

22. The one or more non-transitory computer-readable media of claim 20, wherein the first portion of sensor data comprises a modality of data not present in the second portion of sensor data.

23. The one or more non-transitory computer-readable media of claim 20, wherein the first portion of sensor data comprises data describing a different field of view of the environment as compared to the second portion of sensor data.

* * * * *